United States Patent
Muhlenkamp, IV et al.

(10) Patent No.: US 12,436,452 B2
(45) Date of Patent: Oct. 7, 2025

(54) INTERCONNECT MECHANISMS FOR USE WITH IMAGE CAPTURE DEVICES AND ACCESSORIES

(71) Applicant: GoPro, Inc., San Mateo, CA (US)

(72) Inventors: John George Muhlenkamp, IV, Brisbane, CA (US); Matthew David Thomas, Castro Valley, CA (US); Huy Phuong Nguyen, Alpine, UT (US); Guillaume Abbe, Paris (FR); Bessy Wen-Han Liang, San Jose, CA (US); Zhijun Guo, Shenzhen (CN); Jesse Frost Patterson, Pacifica, CA (US)

(73) Assignee: GoPro, Inc., San Mateo, CA (US)

( * ) Notice: Subject to any disclaimer, the term of this patent is extended or adjusted under 35 U.S.C. 154(b) by 189 days.

(21) Appl. No.: 18/131,034

(22) Filed: Apr. 5, 2023

(65) Prior Publication Data

US 2023/0324774 A1    Oct. 12, 2023

Related U.S. Application Data

(60) Provisional application No. 63/328,601, filed on Apr. 7, 2022.

(51) Int. Cl.
*G03B 17/56* (2021.01)
*G03B 17/04* (2021.01)

(52) U.S. Cl.
CPC ........... *G03B 17/566* (2013.01); *G03B 17/04* (2013.01)

(58) Field of Classification Search
CPC ...... G03B 17/566; G03B 17/04; G03B 17/02; G03B 17/561
See application file for complete search history.

(56) References Cited

U.S. PATENT DOCUMENTS

| | | | |
|---|---|---|---|
| 12,265,317 B2* | 4/2025 | Tonokawa | F16M 13/02 |
| 2008/0011344 A1* | 1/2008 | Barker | G03B 17/561 |
| | | | 135/66 |
| 2014/0191094 A1* | 7/2014 | Esarey | F16M 11/242 |
| | | | 29/525.01 |
| 2020/0159091 A1* | 5/2020 | Vitale | H04N 23/55 |
| 2020/0224862 A1* | 7/2020 | Cornell | F16M 11/242 |

\* cited by examiner

*Primary Examiner* — Christopher E Mahoney
(74) *Attorney, Agent, or Firm* — Young Basile Hanlon & MacFarlane, P.C.

(57) ABSTRACT

Various embodiments of an interconnect mechanism facilitate the connection of an image capture device to an accessory (either directly or indirectly). In one embodiment, the interconnect mechanism includes a rotatable support that is movable between a series (plurality) of discrete rotational positions through an unlimited range of motion. In another embodiment, the interconnect mechanism includes a pivotable support, which allows for reconfiguration of the interconnect mechanism between a stowed configuration, in which the support is concealed, and a deployed configuration, in which the support is exposed so as to facilitate the connection of the interconnect mechanism and the accessory. In yet another embodiment, the interconnect mechanism includes protrusions that are pivotably reconfigurable between a stowed configuration, in which the protrusions are rotatably fixed, and a deployed configuration, in which the protrusions are rotatable through a range of motion about an axis of rotation.

20 Claims, 15 Drawing Sheets

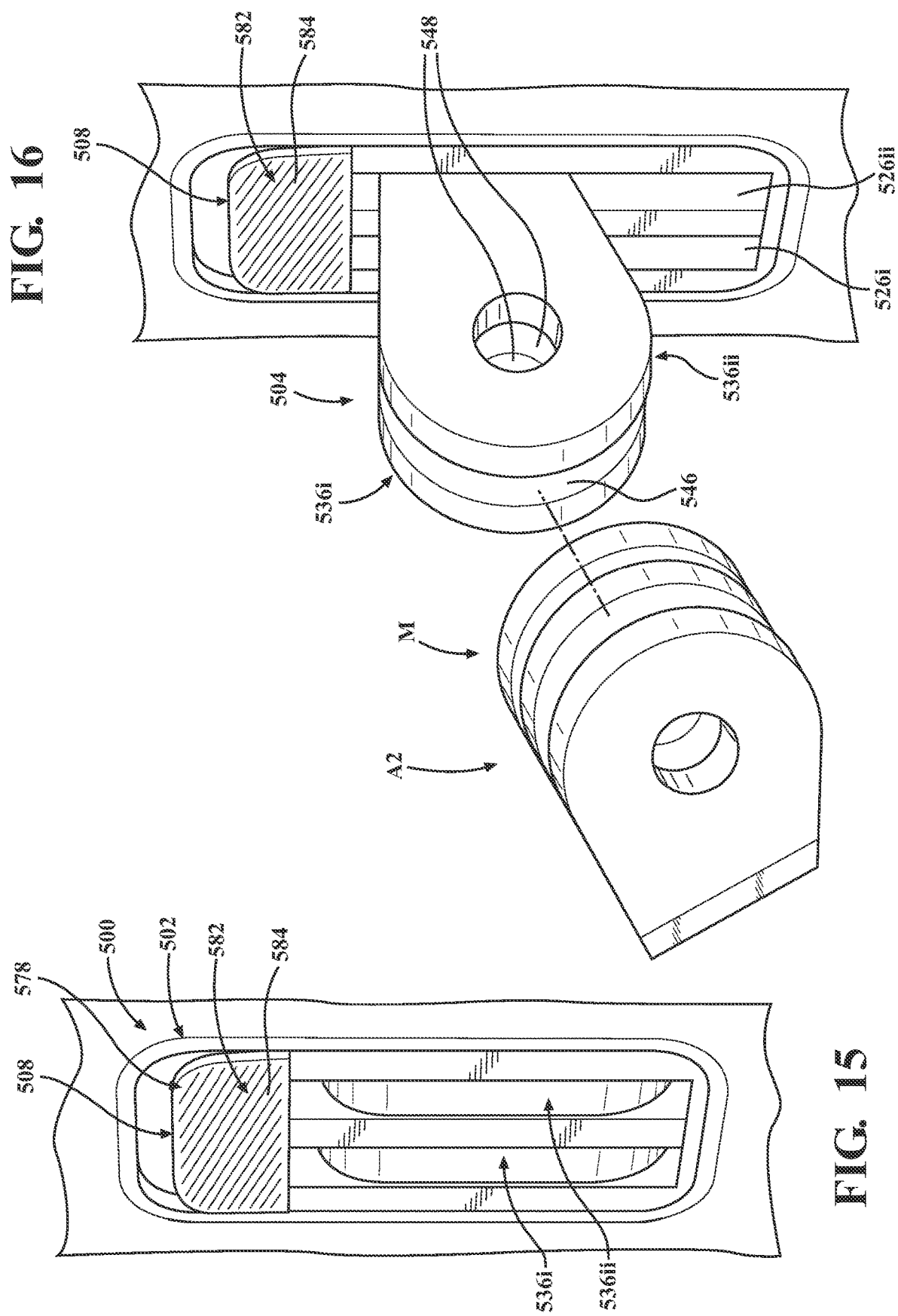

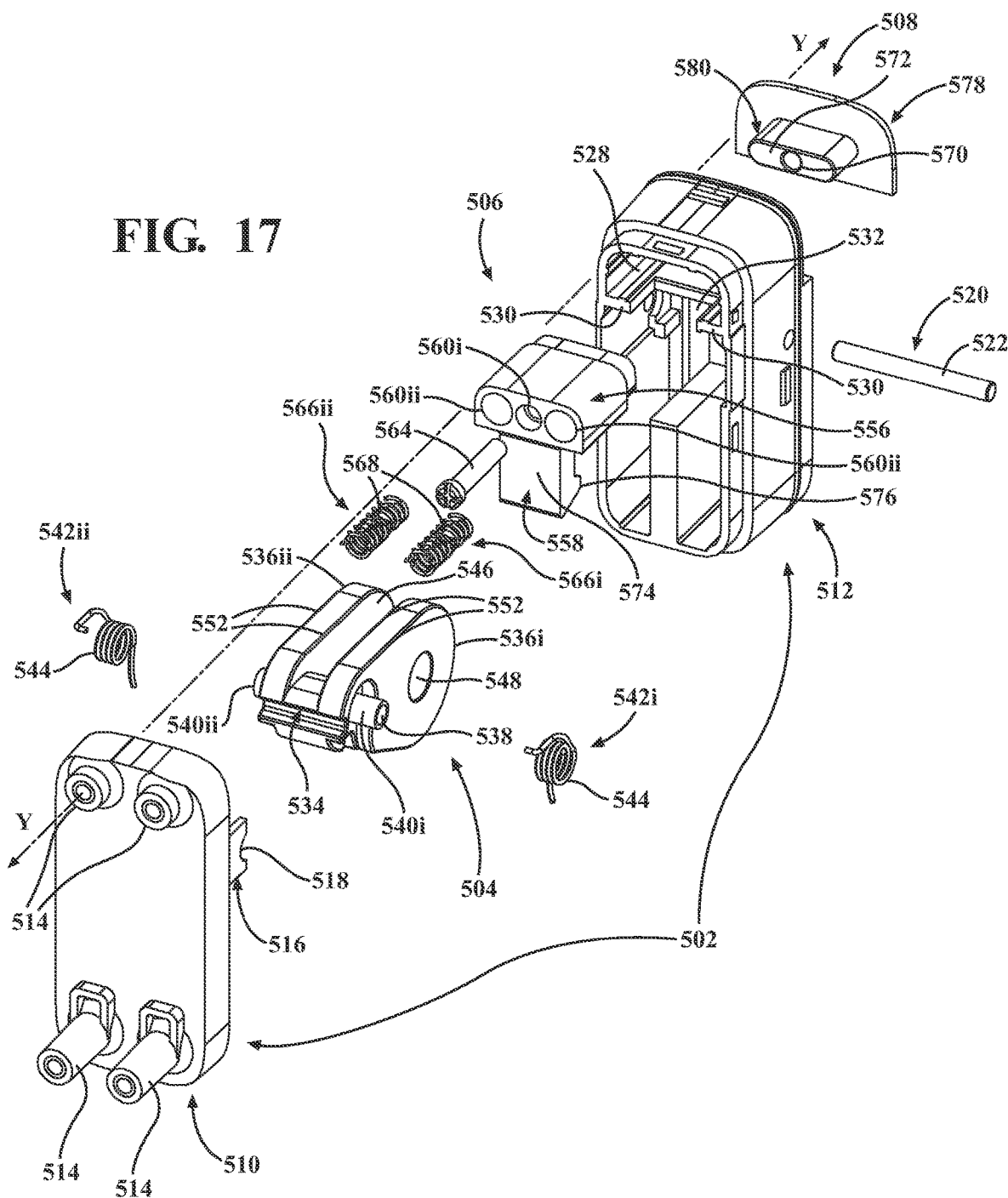

INTERCONNECT MECHANISMS FOR USE WITH IMAGE CAPTURE DEVICES AND ACCESSORIES

CROSS-REFERENCE TO RELATED APPLICATION(S)

This application claims the benefit of and priority to U.S. Provisional Application Patent Ser. No. 63/328,601, filed Apr. 7, 2022, the entire disclosure of which is hereby incorporated by reference.

TECHNICAL FIELD

The present disclosure relates to image capture devices (e.g., cameras, video recorders, cell phones, etc.) and corresponding accessories for use therewith. More specifically, the present disclosure relates to various interconnect mechanisms that support the releasable connection and disconnection of an image capture device to an accessory (either directly or indirectly).

BACKGROUND

Image capture devices are used in various applications, including, for example, handheld cameras and video recorders. To increase versatility, many image capture devices include an interconnect mechanism (e.g., a mount) that is configured for connection to a corresponding interconnect mechanism (e.g., a mount) on an accessory (e.g., a vest, a glove, a helmet, a hat, a tripod, a hand-held apparatus, a power supply, a base configured for connection to the hood of a car, a surfboard, the handlebars of a bicycle, etc.).

The present disclosure provides a variety of interconnect mechanisms that not only increase compatibility but also improve ease of use and the overall user experience.

SUMMARY

In one aspect of the present disclosure, an interconnect mechanism is disclosed that is configured to facilitate the connection of an image capture device to an accessory. The interconnect mechanism includes: a body; a support that is rotatable in relation to the body and which is configured for connection to the image capture device; indexing members that are located between the body and the support; and a biasing member that is located between the body and the support and which is configured to bias the support towards the body.

In certain embodiments, the support may be configured for rotation through an unlimited range of motion.

In certain embodiments, the body and the support may define a gap therebetween that allows for axial movement of the support in relation to the body during rotation of the support.

In certain embodiments, the body may define first recesses and the support may define second recesses.

In certain embodiments, the first recesses and the second recesses may collectively define chambers that are configured to receive the indexing members upon rotational alignment of the first recesses and the second recesses.

In certain embodiments, the first recesses, the second recesses, and the indexing members may correspond in number to thereby define discrete rotational positions for the support.

In certain embodiments, the support may include first protrusions defining channels therebetween that are configured to receive corresponding second protrusions on the image capture device.

In certain embodiments, the interconnect mechanism may further include a fastener that is configured for insertion through the first protrusions and the second protrusions to facilitate releasable connection of the image capture device to the interconnect mechanism.

In certain embodiments, the first protrusions and the second protrusions may include reliefs that are configured to facilitate insertion of the second protrusions into the channels.

In another aspect of the present disclosure, an interconnect mechanism is disclosed that is configured to facilitate the connection of an image capture device to an accessory. The interconnect mechanism includes a housing assembly that defines a longitudinal axis and a support that is pivotable in relation to the housing assembly about a pivot axis, which extends transversely in relation to the longitudinal axis. Pivoting of the support causes reconfiguration of the interconnect mechanism between a stowed configuration, in which the support is concealed within the housing assembly, and a deployed configuration, in which the support extends outwardly from the housing assembly to facilitate connection of the interconnect mechanism to the accessory.

In certain embodiments, the interconnect mechanism may further include a locking mechanism that is movable between a locked position, in which the locking mechanism engages the support to maintain the interconnect mechanism in the stowed configuration or the deployed configuration, and an unlocked position, in which the locking mechanism is disengaged from the support to allow for reconfiguration of the interconnect mechanism between the stowed configuration and the deployed configuration.

In certain embodiments, the interconnect mechanism may further include a first biasing member and a second biasing member. The first biasing member is in engagement with the support to bias the interconnect mechanism towards the deployed configuration, and the second biasing member is in engagement with the locking mechanism to bias the locking mechanism towards the locked position.

In certain embodiments, the support may include first protrusions defining channels therebetween that are configured to receive corresponding second protrusions on the image capture device.

In certain embodiments, the first protrusions and the second protrusions may include reliefs that are configured to facilitate insertion of the second protrusions into the channels.

In certain embodiments, the first protrusions may include a first locking detent that is configured for engagement with the locking mechanism when the interconnect mechanism is in the stowed configuration and a second locking detent that is configured for engagement with the locking mechanism when the interconnect mechanism is in the deployed configuration.

In certain embodiments, the first locking detent and the second locking detent may be offset by approximately 90°.

In certain embodiments, the locking mechanism may include a locking member defining a tooth that is configured for engagement with the first locking detent and the second locking detent to thereby maintain the interconnect mechanism in the stowed configuration and the deployed configuration.

In another aspect of the present disclosure, an interconnect mechanism is disclosed that is configured to facilitate the connection of an image capture device to an accessory. The interconnect mechanism includes first protrusions defining channels therebetween that are configured to receive corresponding second protrusions on the accessory. The first protrusions are pivotably reconfigurable between a stowed configuration, in which the first protrusions are rotatably fixed, and a deployed configuration in which the first protrusions are rotatable about an axis of rotation.

In certain embodiments, the first protrusions may be concomitantly reconfigurable between the stowed configuration and the deployed configuration.

In certain embodiments, the first protrusions may be pivotable about a pivot axis that extends in generally orthogonal relation to the axis of rotation.

In certain embodiments, the first protrusions may be independently reconfigurable between the stowed configuration and the deployed configuration.

In certain embodiments, the first protrusions may be pivotable about separate pivot axes that each extend in generally orthogonal relation to the axis of rotation.

In certain embodiments, the first protrusions may be rotatable into discrete rotational positions through an unlimited range of motion.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 15 is a partial, side, perspective view of an alternate embodiment of the interconnect mechanism shown in a stowed configuration.

FIG. 16 is a partial, side, perspective view of the interconnect mechanism seen in FIG. 15 shown in a deployed configuration.

FIG. 17 is a rear, perspective view of the interconnect mechanism seen in FIGS. 15 and 16 with parts separated.

DETAILED DESCRIPTION

The present disclosure describes various embodiments of interconnect mechanisms that are configured to facilitate the connection of an image capture device to an accessory (e.g., a vest, a glove, a helmet, a hat, a tripod, a hand-held apparatus, a power supply, a base configured for connection to the hood of a car, a surfboard, the handlebars of a bicycle, etc.), either directly or indirectly.

In one embodiment of the present disclosure, the interconnect mechanism includes a rotatable support that is movable between a series (plurality) of discrete rotational positions through an unlimited range of motion. In another embodiment of the disclosure, the interconnect mechanism includes a pivotable support, which allows for reconfiguration of the interconnect mechanism between a stowed configuration, in which the support is concealed, and a deployed configuration, in which the support is exposed so as to facilitate connection of the interconnect mechanism to the accessory. In yet another embodiment, the interconnect mechanism includes protrusions that are pivotably reconfigurable between a stowed configuration, in which the protrusions are rotatably fixed, and a deployed configuration, in which the protrusions are rotatable through a range of motion about an axis of rotation.

Figure 1A:
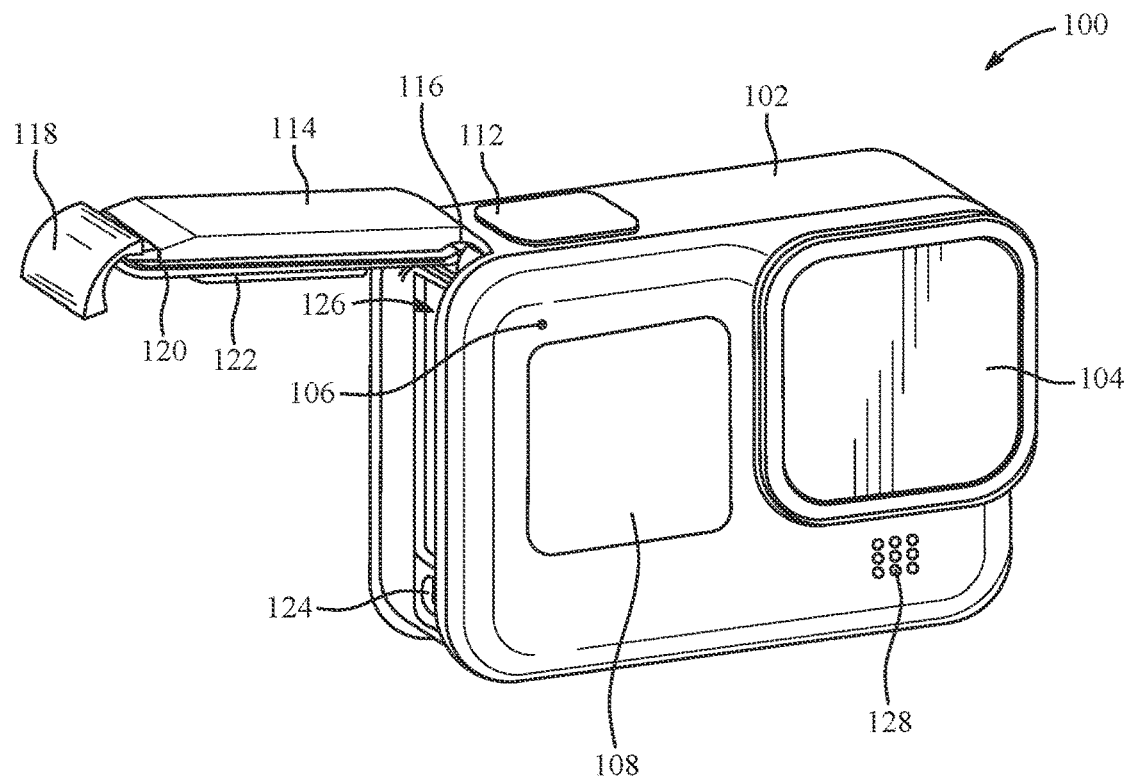
FIGS. 1A-B are isometric views of an example of an image capture device.
Figure 1B:
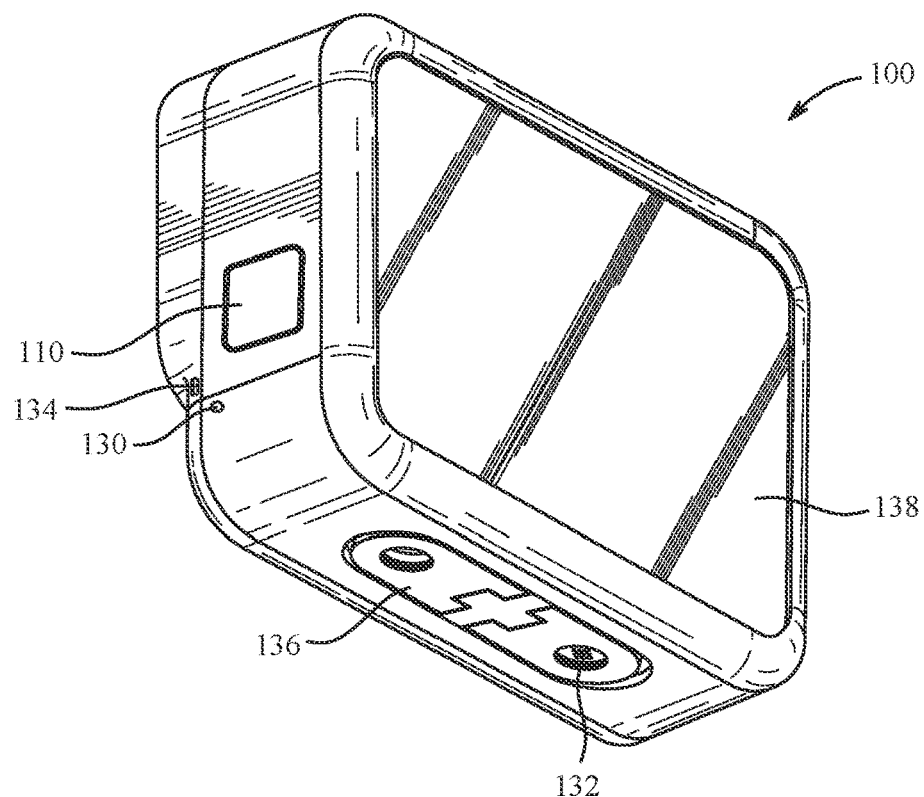

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include a (first) interconnect mechanism 136 for connecting the image capture device 100 to an accessory, handle grip, etc., as described in further detail below. In the example shown in FIG. 1B, the interconnect mechanism 136 includes folding protrusions 137 (e.g., fingers 137A) that are configured to move between a nested or collapsed position as shown and an extended or open position (not shown) that facilitates coupling of the protrusions 137 to mating protrusions of other devices such as accessories, handle grips, mounts, clips, or like devices, as discussed in further detail below. More specifically, the interconnect mechanism 136 includes a (first) protrusion 137$i$ defining a (first) opening 137B$i$ and a (second) protrusion 137$ii$ defining a (second) opening 137B$ii$, which are moveable between the nested and extended positions independently of each other. As seen in FIG. 1B, for example, when the protrusions 137 are in the nested position, the protrusions 137 are received within (accommodated by) corresponding cavities 103, which extend (vertically upward) into the body 102 (e.g., towards the shutter button 112), and when the protrusions 137 are in the extended position, the protrusions 137 are removed from the cavities 103 such that the protrusions 137 extend (vertically downward) from the body (e.g., away from the shutter button 112). More specifically, the body 102 includes a (first) cavity 103$i$ that is configured to receive the protrusion 137$i$ when the protrusion 137$i$ is in the nested position and a (second) cavity 103$ii$ that is configured to receive the protrusion 137$ii$ when the protrusion 137$ii$ is in the nested position. To facilitate reception of the protrusions 137, the cavities 103 include identical (or generally identical) configurations, which correspond to those defined by the protrusions 137. As such, in the illustrated embodiment, the cavities 103 each include a D-shaped (or generally D-shaped) transverse (e.g., horizontal) cross-sectional configuration. It should be appreciated, however, that the particular configurations of the protrusions 137 and the cavities 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
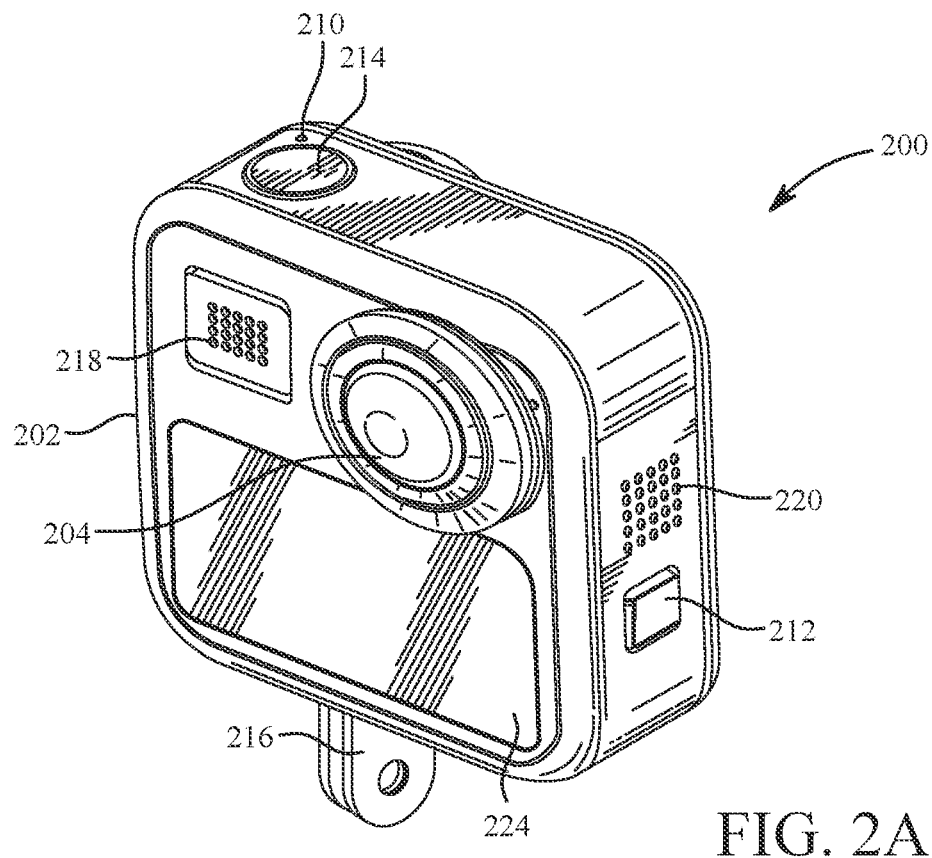
FIGS. 2A-B are isometric views of another example of an image capture device.
Figure 2B:
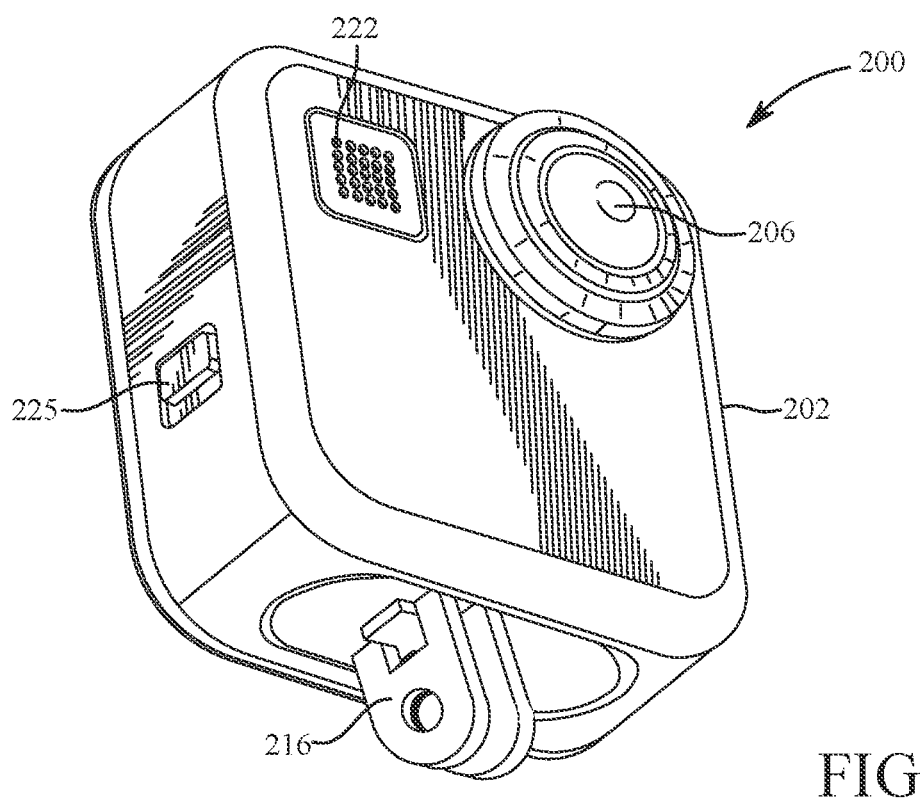

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
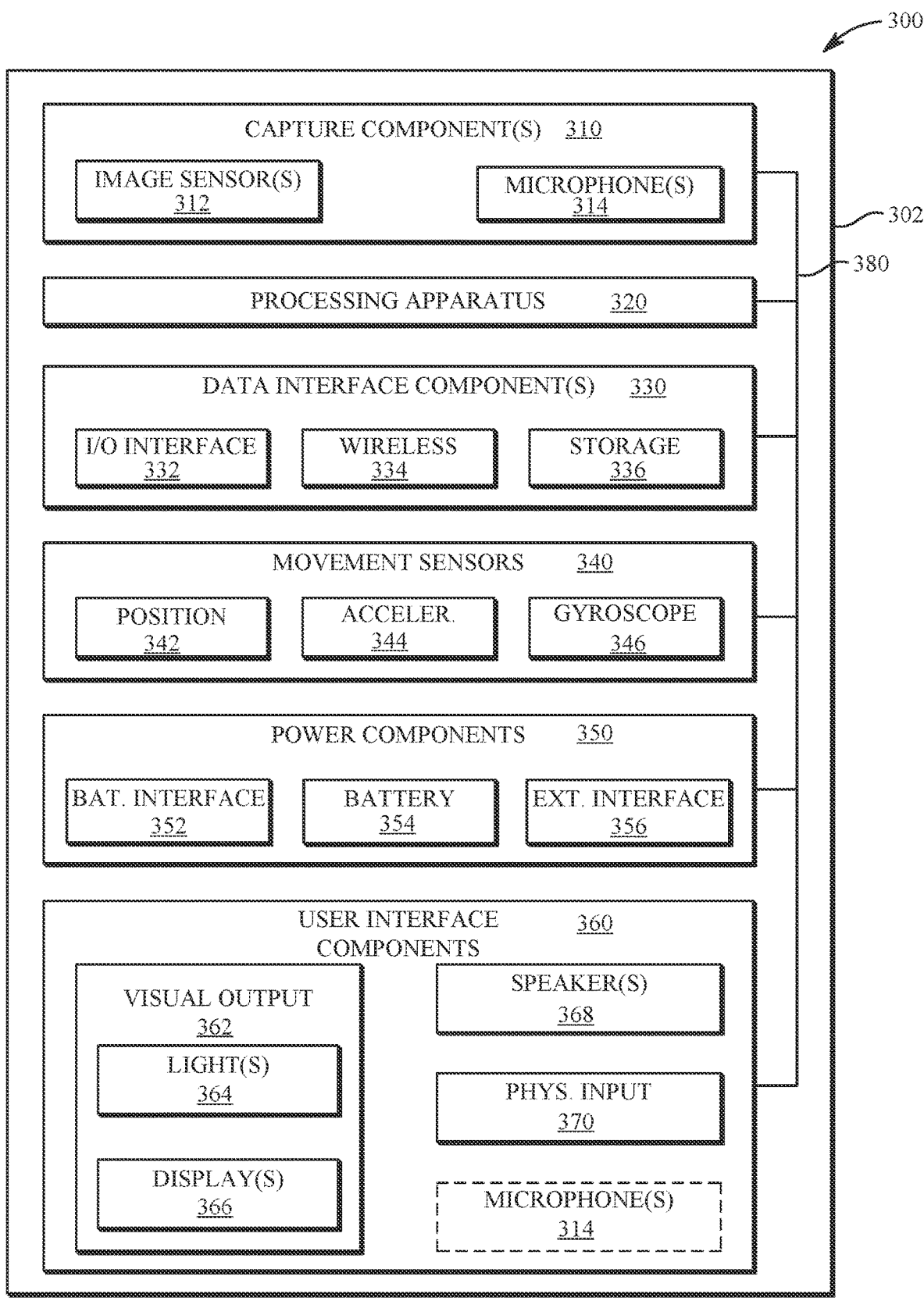
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or one or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
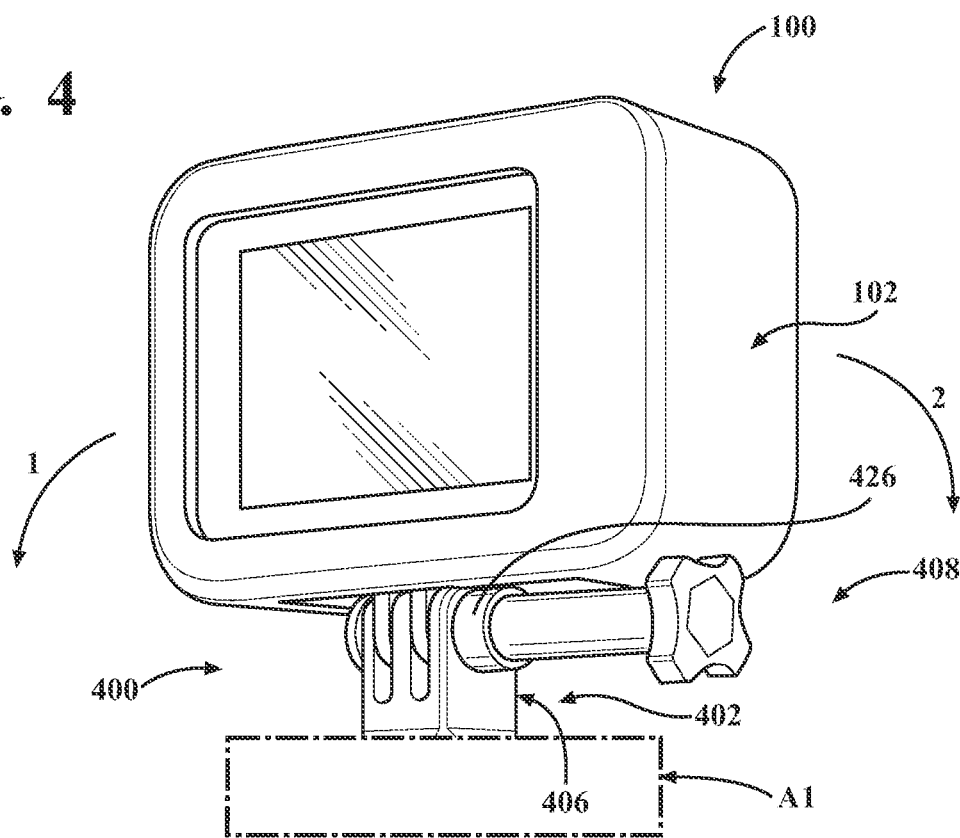
FIG. 4 is a rear, perspective view of one embodiment of the presently disclosed interconnect mechanism shown connected to the image capture device seen in FIGS. 1A, 1B.
Figure 5:
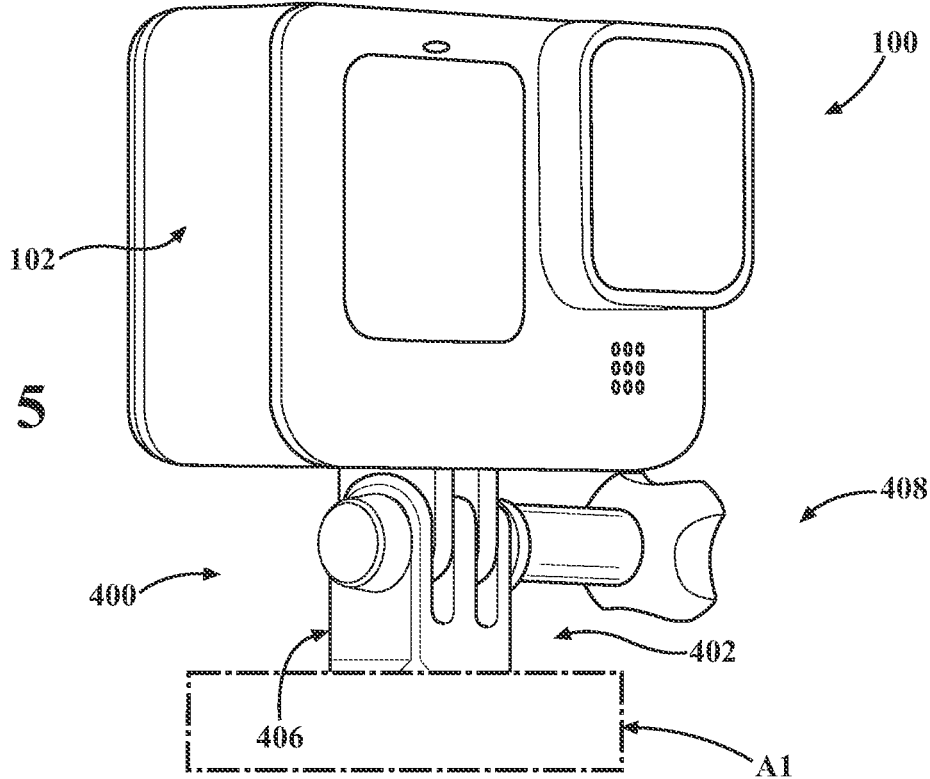
FIG. 5 is a front, perspective view of the interconnect mechanism and the image capture device.
Figure 6:
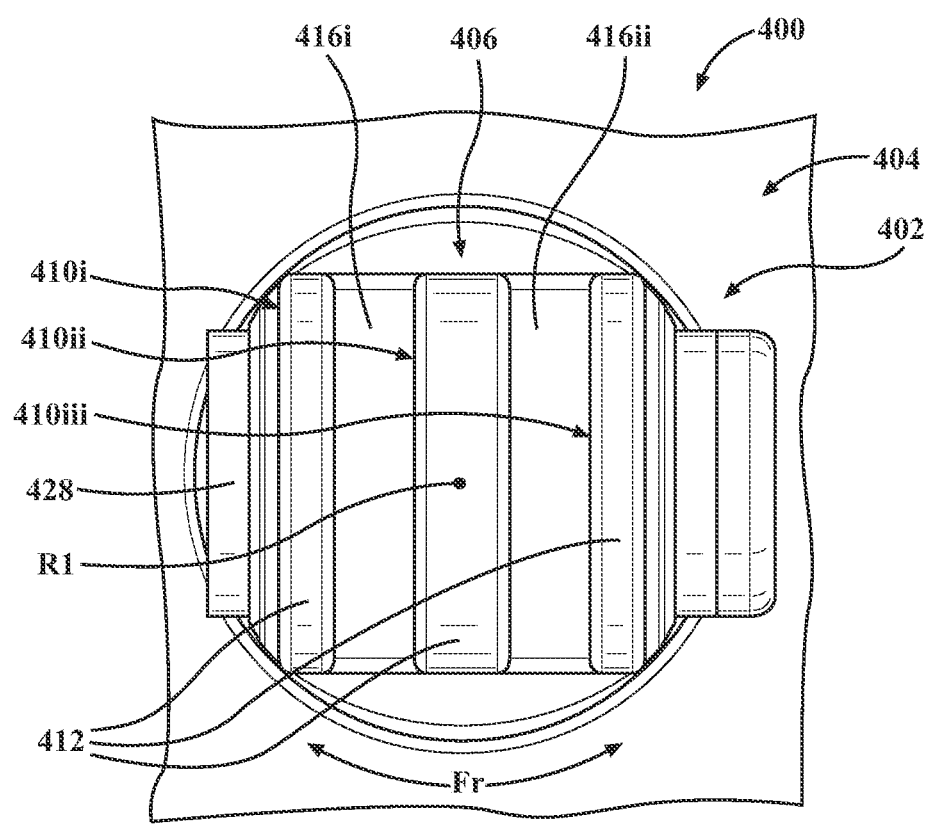
FIG. 6 is a top, plan view of the interconnect mechanism.
Figure 7:
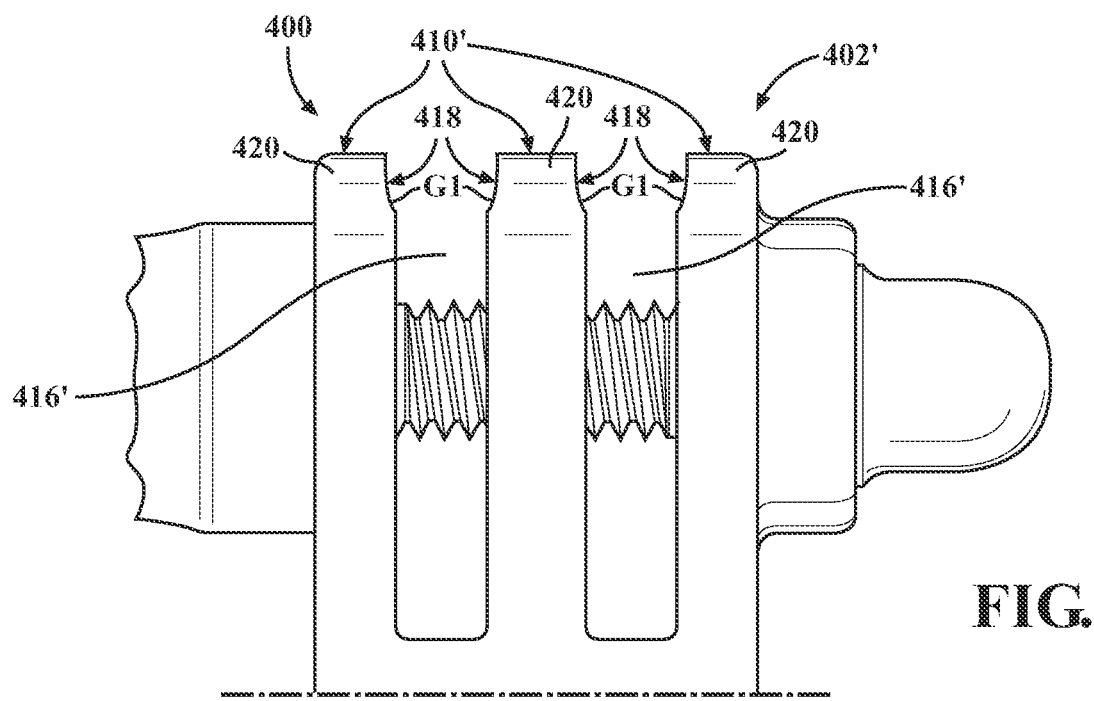
FIG. 7 is a partial, front, plan view of the interconnect mechanism according to an alternate embodiment of the disclosure.
Figure 8:
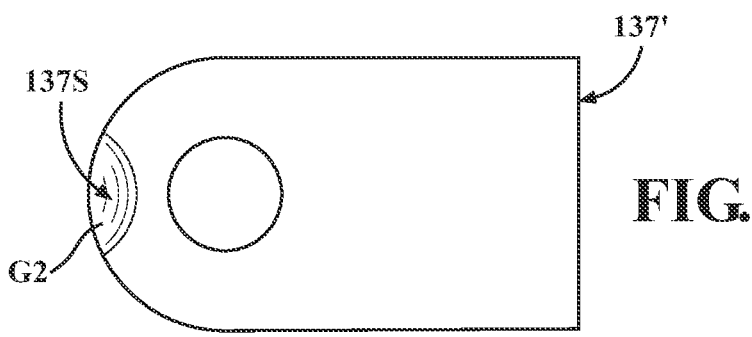
FIG. 8 is a partial, top, plan view of a protrusion included on an alternate embodiment of the image capture device.
Figure 9:
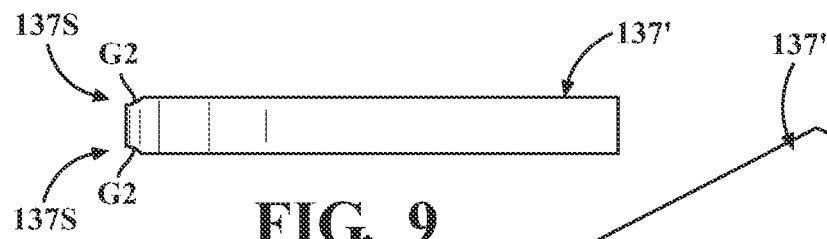
FIG. 9 is a side, plan view of the protrusion seen in FIG. 8.
Figure 10:
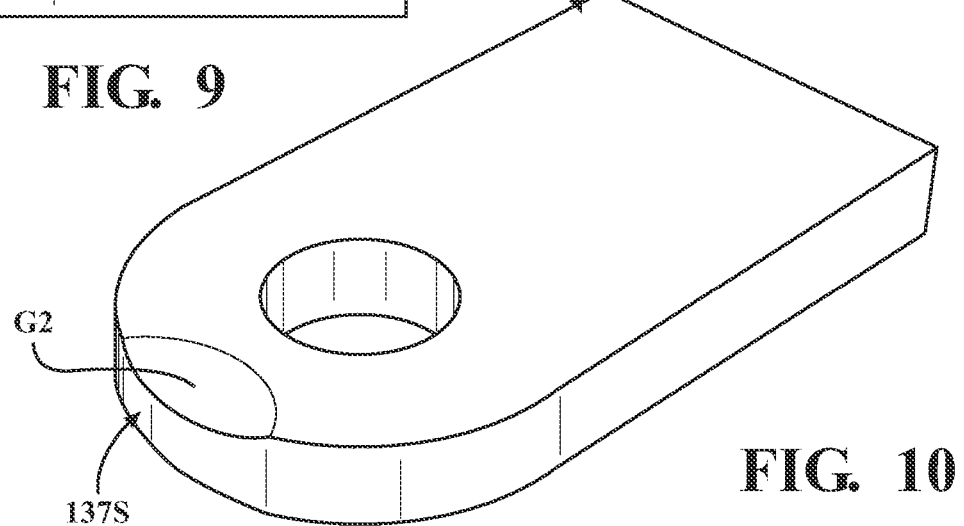
FIG. 10 is a top, perspective view of the protrusion seen in FIG. 8.
Figure 11:
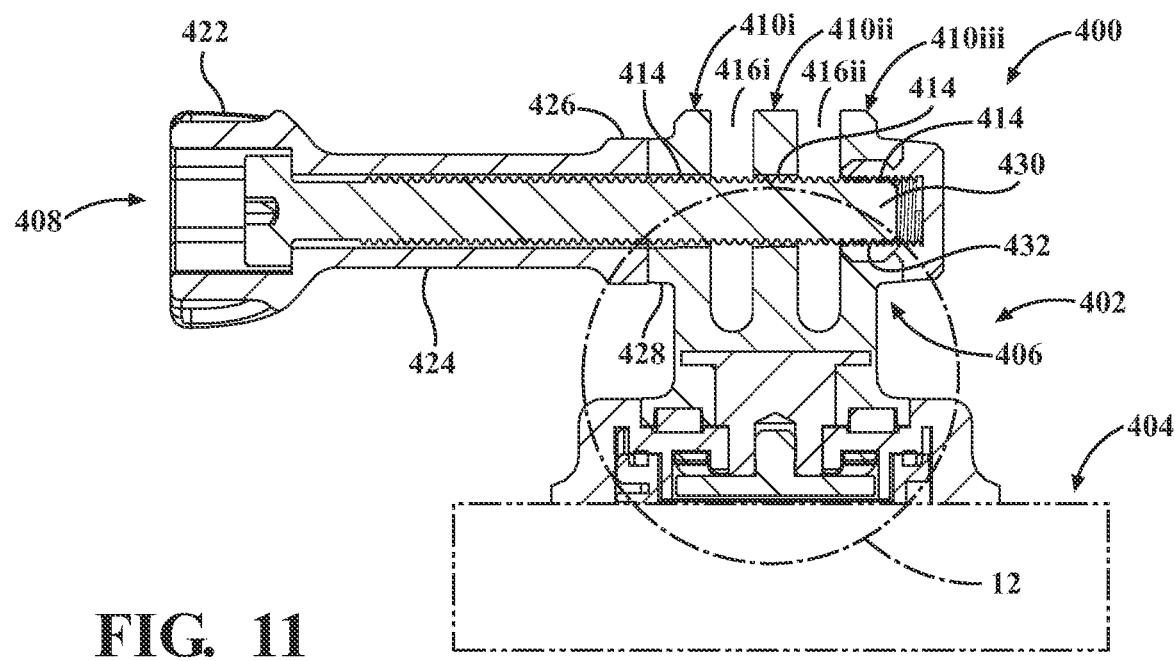
FIG. 11 is a longitudinal (vertical) cross-sectional view of the interconnect mechanism.
Figure 12:
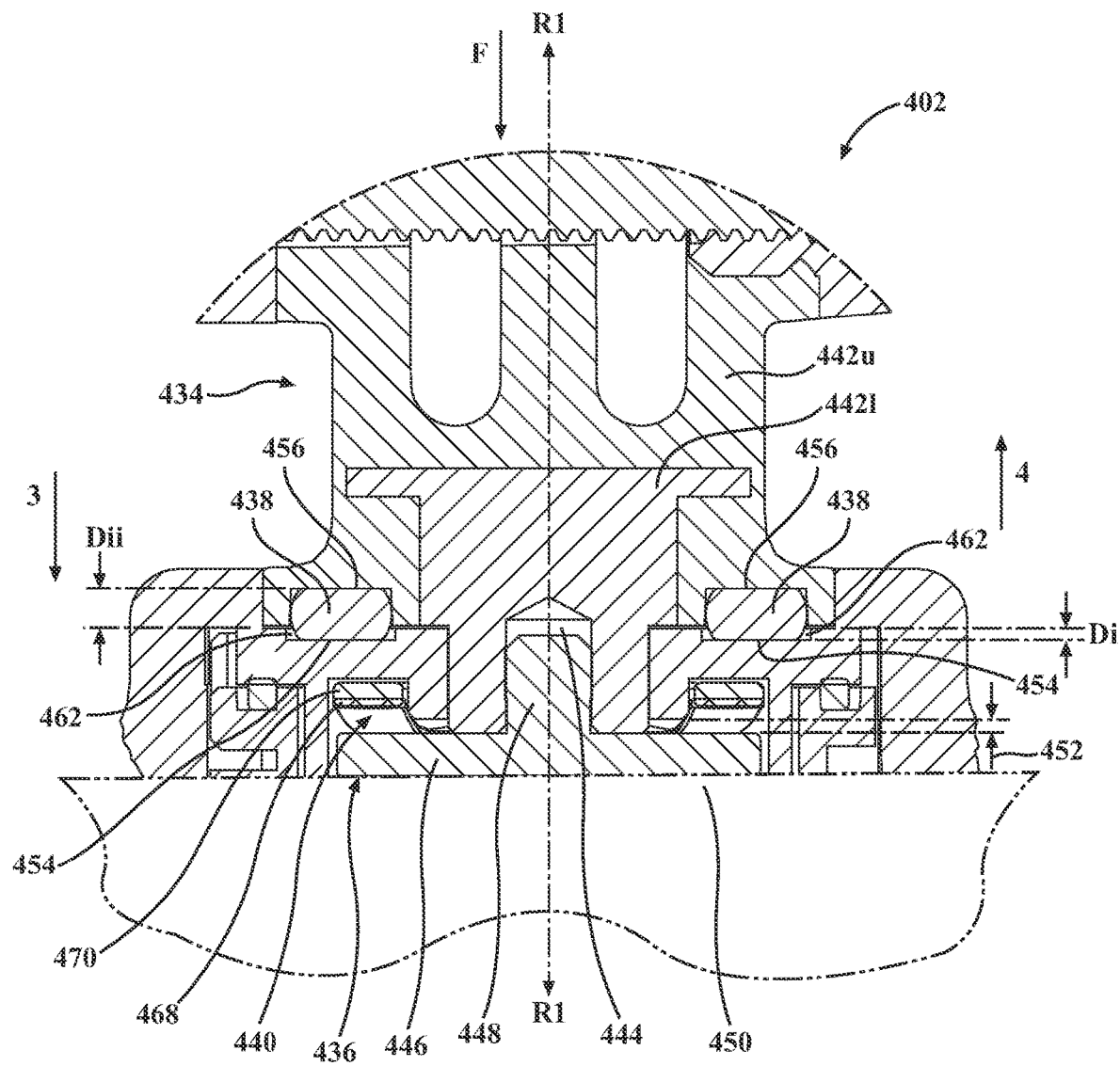
FIG. 12 is an enlargement of the area of detail identified in FIG. 11.
Figure 13:
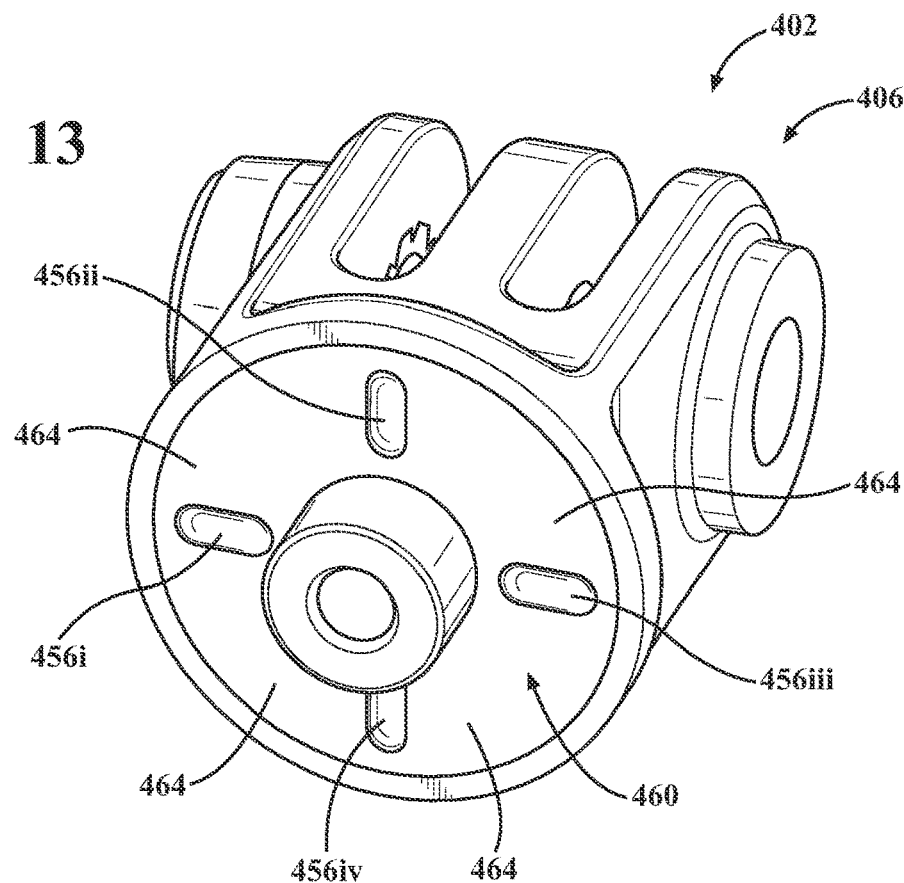
FIG. 13 is a bottom, perspective view of the interconnect mechanism.
Figure 14:
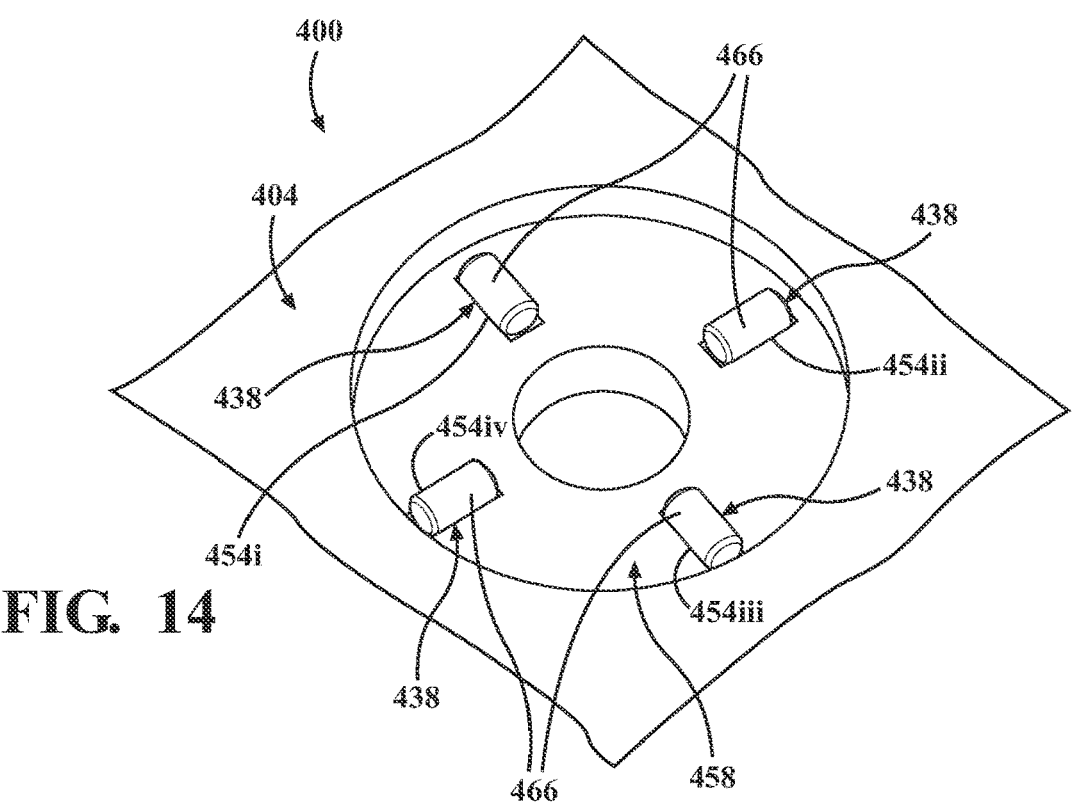
FIG. 14 is a partial, top, perspective view of the interconnect mechanism.

Referring now to FIGS. 4-14, one embodiment of the presently disclosed interconnect mechanism will be discussed, which is identified by the reference character 400. More specifically, FIG. 4 provides a rear, perspective view of the interconnect mechanism 400, which includes a (first) support 402 and a body 404 (FIG. 6), shown connected to the image capture device 100; FIG. 5 provides a front, perspective view of the interconnect mechanism 400 and the image capture device 100; FIG. 6 provides a top, plan view of the interconnect mechanism 400; FIG. 7 provides a partial, front, plan view of the interconnect mechanism 400 including an alternate embodiment of the support, which is identified by the reference character 402'; FIG. 8 provides a top, plan view of an alternate embodiment of one of the protrusions 137 on the image capture device 100, which is identified by the reference character 137'; FIG. 9 provides a side, plan view of the protrusion 137'; FIG. 10 provides a top, perspective view of the protrusion 137'; FIG. 11 provides a longitudinal (vertical) cross-sectional view of the interconnect mechanism 400; FIG. 12 provides an enlargement of the area of detail identified in FIG. 11; FIG. 13 provides a bottom, perspective view of the support 402 of the interconnect mechanism 400; and FIG. 14 provides a partial, top, perspective view of the body 404 of the interconnect mechanism 400.

The interconnect mechanism 400 is configured for connection to (engagement with) a (first) accessory A1 (e.g., a vest, a glove, a helmet, a hat, a tripod, a hand-held apparatus, a power supply, a base configured for connection to the hood of a car, a surfboard, the handlebars of a bicycle, etc.), and thereby facilitates (indirect, operative) connection of the image capture device 100 to the accessory A1. Although generally discussed in connection with the image capture device 100 herein below, it should be appreciated that the interconnect mechanism 400 may be configured for use with any image capture device, such as the various embodiments of the image capture devices described herein (e.g., the aforedescribed image capture devices 200, 300).

The support 402 allows for the connection of the image capture device 100 to the interconnect mechanism 400 and facilitates utilization of the image capture device 100 and the interconnect mechanism 400 across a variety of use cases (e.g., hand-held use, hands-free use, wearable use, etc.). The support 402 interfaces with (e.g., is received by) the body 404, and includes a (first) engagement member 406 that is configured for releasable engagement with (coupling to) the interconnect mechanism 136 (FIG. 1B) on the image capture device 100 and an adjustable fastener 408, which cooperatively facilitate connection, disconnection, and securement of the image capture device 100 to the interconnect mechanism 400.

The engagement member 406 includes (a first set, series, plurality of) protrusions 410 (e.g., fingers 412) that interface (engage) with (contact, connect to) the protrusions 137 (FIGS. 1B, 4) on the image capture device 100. The protrusions 410 each include an opening 414 (FIG. 11) and define channels 416 therebetween that are configured to receive the protrusions 137 such that the protrusions 137 are received by (positioned within) the channels 416, thereby aligning the openings 414 with corresponding openings 137B (FIG. 1B) in the protrusions 137. While the support 402 is shown as including three protrusions 410*i*, 410*ii*, 410*iii* and two channels 416*i*, 416*ii* in the particular embodiment illustrated, it should be appreciated that the particular numbers of protrusions 410 and channels 416 may be varied in alternate embodiments without departing from the scope of the present disclosure (e.g., depending on the number of protrusions 137 included on the image capture device 100).

With reference to FIGS. 7-10, in contrast to the support 402, in which the protrusions 410 are uniform (or generally uniform) (e.g., smooth) along the length thereof (except for inclusion of the openings 414), the support 402' includes protrusions 410' with reliefs 418 (e.g., scallops, indentations, picks, or other such recesses), which are provided on (outer) end portions 420 thereof and correspond in configuration to reliefs 137S (e.g., scallops, indentations, picks, or other such recesses) provided on the protrusion(s) 137'. In the particular embodiment illustrated, the reliefs 418, 137S are each annular (e.g., semi-circular) in configuration. It should be appreciated, however, that alternate configurations for the reliefs 418, 137S are also envisioned herein and would not be beyond the scope of the present disclosure.

The reliefs 418, 137S extend into the protrusions 410', 137' to reduce the surface area thereof and define guide surfaces G1, G2, respectively, which facilitates insertion of the protrusions 137' into the channels 416' and, thus, connection of the image capture device 100 to the interconnect mechanism 400. Additionally, the reliefs 137S on the protrusion(s) 137' enhance manual engagement by the user to facilitate reconfiguration of the protrusions 137' from the nested position into the extended position.

Although illustrated and described in connection with the interconnect mechanism 400 and the image capture device 100 in FIGS. 7-10, it should be appreciated that the respective reliefs 418, 137S may be incorporated into any of the interconnect mechanisms and image capture devices described herein.

Referring now to FIG. 11, the fastener 408 is configured to secure the image capture device 100 to the interconnect mechanism 400 and to apply a variable compressive force to the protrusions 137, 432, which allows for adjustment in the position of the image capture device 100 (relative to the interconnect mechanism 400). The fastener 408 includes a handle 422 and a shank 424 that is secured to the handle 422 such that rotation of the handle 422 causes corresponding rotation of the shank 424.

The handle 422 defines an end cap 426 that is configured for engagement (contact) with the protrusion 410i. More specifically, the end cap 426 is configured for engagement (contact) with an external support surface 428 defined by the protrusion 410i, which inhibits (if not entirely prevents) relative movement between the end cap 426 and the protrusion 410i during adjustment of the fastener 408, as discussed in further detail below.

The shank 424 is configured for insertion through the openings 414, 137B in the protrusions 410, 137, respectively, and includes a threaded operative end 430 that is configured for engagement with corresponding internal threading 432 on the protrusion 410iii. The threaded engagement between the shank 424 and the protrusion 410iii allows for connection and disconnection of the fastener 408 (e.g., to allow for removal of the fastener 408 and connection of the image capture device 100 to the interconnect mechanism 400) as well as compression of the protrusions 410, 137 upon rotation of the shank 424 via the handle 422 (e.g., during adjustment of the fastener 408). More specifically, rotation of the handle 422 (and, thus, the shank 424) in a first direction (e.g., clockwise) causes engagement of the operative end 430 and the internal threading 432 on the protrusion 410iii and tightens the fastener 408. Oppositely, rotation of the handle 422 (and, thus, the shank 424) in a second direction (e.g., counterclockwise) loosens the fastener 408 and results in disengagement of the operative end 430 and the internal threading 432 on the protrusion 410iii, which allows for removal of the fastener 408 and separation of the image capture device 100 from the interconnect mechanism 400).

Due to the engagement (contact) between the end cap 426 and the external support surface 428, tightening of the fastener 408 causes (laterally) inward deflection of the protrusions 410i, 410iii and the protrusions 137 (e.g., movement towards the protrusion 410ii) to thereby secure the relative positions of the image capture device 100 and the interconnect mechanism 400 via compression of the support 402 and the image capture device 100 and frictional engagement between the protrusions 410, 137. Oppositely, loosening of the fastener 408 alleviates compression on the support 402 and the image capture device 100 and allows the protrusions 410i, 410iii and the protrusions 137 to move outwardly (e.g., away from the protrusion 410ii) and return to their initial positions, which permits relative movement between the image capture device 100 and the interconnect mechanism 400. For example, in the illustrated embodiment, the support 402 and the image capture device 100 are configured to allow for bi-directional tilting of the image capture device 100 relative to the interconnect mechanism 400 in opposing directions 1, 2 (FIG. 4) (e.g., forward and rearward, left and right, etc.). More specifically, the support 402 is configured to allow for tilting of the image capture device 100 through a range of motion that lies substantially within the range of approximately 180 degrees (e.g., approximately 90 degrees of tilt in each of the directions 1, 2), which is limited and defined by contact between the body 102 of the image capture device 100 and the interconnect mechanism 400 (e.g., the support 402 and/or the body 404). It should be appreciated, however, that the tiltable range of motion may be increased or decreased as necessary or desired in alternate embodiments of the present disclosure by varying the particular configurations of the body 102 of the image capture device 100 and the interconnect mechanism 400 (e.g., the support 402 and/or the body 404) such as, for example, by adding material thereto or removing material therefrom.

The support 402 is rotatable in relation to the body 404 of the interconnect mechanism 400 about an axis of rotation R1 (FIGS. 6, 12) through an unlimited range of motion, which allows for orientation of the image capture device 100 in a variety of rotationally offset positions. As seen in FIG. 12, the support 402 includes: a housing 434; a base 436; (a set, series, plurality of) indexing members 438; and a biasing member 440.

The housing 434 includes an upper housing component 442u and a lower housing component 442l defining a chamber 444. In the particular embodiment illustrated, the upper and lower housing components 460u, 460l are configured as discrete members that are molded together. Alternate methods of manufacture of the housing 434 and/or connection of the housing components 460u, 460l, however, are also contemplated herein, as are embodiments in which the housing 434 may be unitarily (e.g., monolithically) formed.

The base 436 includes a platform 446 and a rivet 448 that extends (upwardly) from the platform 446 into the chamber 444 defined by the lower housing component 442l. Although shown as being integrally (e.g., unitarily, monolithically) formed in the illustrated embodiment, it is also envisioned that the platform 446 and the rivet 448 may be formed as discrete members that may be connected together in any suitable manner (e.g., via one or more mechanical fasteners, via an adhesive, via ultrasonic welding, etc.).

The platform 446 is positioned within a cavity 450 defined by the body 404 of the interconnect mechanism 400 such that the support 402 is received by the body 404. More specifically, the base 436 is positioned (axially, vertically) between the housing 434 of the support 402 and the body 404 so as to define a gap 452 between the base 436 and the body 404. As discussed in further detail below, the gap 452 allows for relative axial (vertical) deflection (movement) of the support 402 in relation to the body 404 during rotation of the support 402 and defines the range of (axial) motion for the support 402, the upper end of which is delimited by contact between the platform 446 and the body 404.

To reduce wear between the housing 434 and the rivet 448, it is envisioned that a variety of materials may be utilized. For example, in the illustrated embodiment, whereas the upper housing component 442u includes (e.g., is formed from) one or more plastic materials, the lower housing component 442l and the base 436 (e.g., the rivet 448) include (e.g., are formed from) one or more metallic materials.

In various embodiments of the present disclosure, it is envisioned that the housing 434 and the base 436 may rotate in unison during rotation of the support 402 (e.g., via frictional and/or mechanical engagement between the rivet 448 and the lower housing component 442l). Alternatively, it is envisioned that the housing 434 and the base 436 may be configured such that the housing 434 is rotatable in relation to the base 436 (e.g., about the rivet 448) during rotation of the support 402.

The body 404 of the interconnect mechanism 400 and the housing 434 (e.g., the lower housing component 442l) include corresponding recesses 454, 456, respectively, which are spaced outwardly from the axis of rotation R1 and are configured for selectively alignment during rotation of the support 402. More specifically, the recesses 454 extend into an upper surface 458 (FIG. 14) of the body 404 and the recesses 456 extend into a lower surface 460 (FIG. 13) of the support 402 (e.g., the lower housing component 442l). When rotationally aligned, the recesses 454, 456 collectively define chambers 462 (FIG. 12) that are configured to receive the indexing members 438, such that the indexing members 438 are located between the support 402 and the body 404. When out of rotational alignment, the indexing members 438 are positioned between the recesses 454 in the upper surface 458 of the body 404 and (generally planar) sections 464 (FIG. 13) of the lower surface 460 of the lower housing component 442l located between the recesses 456. As described in further detail below, the indexing members 438 and the recesses 454, 456 correspond in number so as to define a series (plurality) of discrete rotational positions for the support 402.

In the particular embodiment of the present disclosure illustrated, the indexing members 438 are configured as bearings (rollers) 466 (FIG. 14), which allows for rotation (revolution) of the bearings 466 during rotation of the support 402. It should be appreciated, however, that the particular configuration of the indexing members 438 may be varied in alternate embodiments without departing from the scope of the present disclosure. For example, it is also envisioned that the indexing members 438 may include pins or other such members that are deflectable (e.g., compressible) during rotation of the support 402 as the recesses 454, 456 are moved into and out of rotational alignment.

It is envisioned that the indexing members 438 may include any material or combination of materials suitable for the purpose of reducing wear and increasing the usable life of the indexing members 438 and the interconnect mechanism 400. For example, while the indexing members 438 are illustrated as including (e.g., being formed from) one or more metallic materials in the particular embodiment illustrated, it should be appreciated that alternate materials of construction may be utilized without departing from the scope of the present disclosure. Additionally, in certain embodiments, it is envisioned that a lubricant (e.g., grease or the like) may be employed to reduce friction between the housing 434 and the body 404 of the interconnect mechanism 400 during rotation of the support 402. For example, it is envisioned that the lubricant may be applied as a coating to the recesses 454, 456 and/or the indexing members 438.

In the particular embodiment illustrated, the body 404 of the interconnect mechanism 400 includes four recesses 454i-454iv each defining a depth Di (FIG. 12) and the housing 434 includes four recesses 456i-456iv each defining a depth Dii. As seen in FIG. 12, the recesses 454, 456 are configured such that the depth Dii exceeds the depth Di. It should be appreciated, however, that the particular depths Di, Dii respectively defined by the recesses 454, 456 may be varied without departing from the scope of the present disclosure (e.g., to alter wear on the support 402 and/or the indexing members 438, to alter the tactile feel of the support 402 during rotation, etc.). For example, it is envisioned that the recesses 454, 456 may be configured such that the depths Di, Dii are (approximately) equal or such that the depth Di exceeds the depth Dii.

The recesses 454, 456 are arranged such that adjacent recesses 454, 456 are separated by (approximately) 90 degrees, which allows for positioning of the support 402 in four discrete (cardinal) rotational positions relative to the body 404 that are also (sequentially) separated by (approximately) 90 degrees. More specifically, the support 402 is positionable in: (i) a first position, in which the recesses 454i-454iv are aligned with the recesses 456i-456iv, respectively; (ii) a second position, in which the recesses 454i, 454ii, 454iii, 454iv are aligned with the recesses 456ii, 456iii, 456iv, 456i, respectively; (iii) a third position, in which the recesses 454i, 454ii, 454iii, 454iv are aligned with the recesses 456iii, 456iv, 456i, 456ii, respectively; and (iv) a fourth position, in which the recesses 454i, 454ii, 454iii, 454iv are aligned with the recesses 456iv, 456i, 456ii, 456iii, respectively. It should be appreciated, however, that the particular number of recesses 454, 456 and indexing members 438 may be increased or decreased in alternate embodiments of the present disclosure to vary the corresponding number of discrete rotational positions for the support 402 as necessary or desired. As such, embodiments of the present disclosure include fewer and greater numbers of recesses 454, 456 and indexing members 438 are contemplated herein, as are embodiments in which the housing 434 and the body 404 are entirely devoid of the recesses 454 and/or the recesses 456.

The biasing member 440 is located between the support 402 and the body 404. More specifically, the biasing member 440 is located within the cavity 450 defined by the body 404 of the interconnect mechanism 400 and is positioned (axially, vertically) between the base 436 and the body 404. In the particular embodiment illustrated, the biasing member 440 is configured as a wave spring 468 that includes (e.g., is formed from) one or more metallic materials. It should be appreciated, however, that the particular configuration of the biasing member 440 may be varied in alternate embodiments without departing from the scope of the present disclosure.

The biasing member 440 is under constant compression and applies an axial force F (FIG. 12) to the support 402 that urges (biases) the support 402 (vertically) downward (e.g., towards the body 404) along the axis of rotation R1 in the direction identified by arrow 3. The axial force F not only maintains assembly of the interconnect mechanism 400 (e.g., engagement (contact) between the support 402 and the body 404) but also maintains positioning of the indexing members 438 within the recesses 454 defined in the upper surface 458 of the body 404. Additionally, the axial force F resists axial deflection of the support 402 (e.g., (vertically) upward movement of the support 402 away the body 404)

along the axis of rotation R1 in the direction identified by the arrow 4 during rotation of the support 402, which secures the support 402 in each of the discrete (cardinal) rotational positions until the application of a threshold rotational force Fr (FIG. 6) to the support 402. Upon application of the threshold rotational force Fr, the axial force F is overcome, which allows for rotation of the support 402. The biasing member 440 (and the axial force F applied to the support 402 thereby) thus inhibits (if not entirely prevents) unintended rotation of the support 402 and the image capture device 100.

In certain embodiments of the present disclosure, such as that which is illustrated, it is envisioned that the biasing member 440 may be configured such that the axial force F applied to the support 402 is sufficient to resist unintended rotation of the support 402 when the support 402 is located between the cardinal positions (e.g., when the indexing members 438 are in contact with the (generally planar) sections 464 (FIG. 13) of the lower surface 460 of the lower housing component 442l located between the recesses 456.

To reduce wear (e.g., friction, abrasion, etc.) on the biasing member 440 and/or the body 404 of the interconnect mechanism 400, it is envisioned that the interconnect mechanism 400 may include a washer 470 (FIG. 12) (or other such suitable member) positioned between the biasing member 440 and the body 404. For example, in the illustrated embodiment, a single washer 470 is provided that includes (e.g., is formed from) nylon. It should be appreciated, however, that the particular number of washers 470 and/or the material(s) used in construction of the washer 470 may be varied in alternate embodiments without departing from the scope of the present disclosure.

With continued reference to FIGS. 4-14, use of the support 402 will be discussed. Initially, the fastener 408 (FIGS. 4, 5, 11) is loosened (e.g., via counterclockwise rotation of the handle 422) and removed from the support 402, which allows for insertion of the protrusions 137 on the image capture device 100 into the channels 416 defined between the protrusions 410 on the support 402. The fastener 408 is then inserted through the openings 414 (FIG. 11), 137B (FIG. 1B) in the protrusions 410, 137, respectively, such that the operative end 430 of the shank 424 engages the internal threading 432 on the protrusion 410iii. The fastener 408 is then rotated (e.g., clockwise via the handle 422) to thereby secure the fastener 408 to the protrusion 410iii and connect the image capture device 100 and the interconnect mechanism 400. Once the particular degree of tilt between the image capture device 100 and the interconnect mechanism 400 is achieved, the fastener 408 can be further tightened to fix the position of the image capture device 100 via compression of the protrusions 410, 137.

During adjustment of the tilt angle, it is envisioned that the fastener 408 may be incrementally adjusted to vary the compressive force applied to the protrusions 410, 137. For example, the fastener 408 may be tightened to an initial extent and thereby apply compression sufficient to stabilize the image capture device 100 at a desired angle and allow for fine-tuning in the particular position thereof. Thereafter, once the position of the image capture device 100 has been finalized, additional compression can be applied to the protrusions 410, 137 by further tightening the fastener 408 so as to inhibit (if not entirely prevent) unintended variation in the tilt angle of the image capture device 100 during use.

During use of the interconnect mechanism 400, if necessary or desired, the rotational position of the image capture device 100 can be varied by rotating the support 402 via the (manual) application of force to the image capture device 100 or the support 402 (e.g., via the handle fastener 408). As the applied rotational force is increased, the support 402 begins to rotate as the recesses 456 (FIGS. 12, 13) in the housing 434 traverse the indexing members 438. Upon reaching the threshold rotational force Fr, the support 402 is deflected (axially, vertically) upward (e.g., away from the body 404 of the interconnect mechanism 400) in the direction indicated by arrow 4 (FIG. 12), which reduces (closes) the gap 452 and increases compression of the biasing member 440 and, thus, the axial force F. Rotation of the support 402 continues until the indexing members 438 are removed from the recesses 456 and are positioned therebetween (e.g., such that the indexing members 438 engage (contact) the (generally planar) sections 464 (FIG. 13)), at which point, axial deflection of the support 402 is at a maximum and the gap 452 is at an operational minimum. For example, in certain embodiments, it is envisioned that the base 436 (e.g., the platform 446) and the body 404 of the interconnect mechanism 400 may be configured such that the gap 452 is entirely closed at the point of maximum axial deflection of the support 402 (e.g., via contact between the base 436 (FIG. 12) (e.g., the platform 446) and the body 404 of the interconnect mechanism 400).

Continued rotation of the image capture device 100 and the support 402 realigns the recesses 456 and the indexing members 438, at which point, the axial force F applied by the biasing member 440 urges the support 402 (axially, vertically) downward (e.g., towards the body 404 of the interconnect mechanism 400) in the direction indicated by arrow 3 (FIG. 12). As the indexing members 438 re-enter the recesses 456, the gap 452 is restored to an operation maximum and compression on the biasing member 440 is alleviated. As compression on the biasing member 440 is alleviated, the axial force F is reduced, which provides the user with a tactile indication that the support 402 is secured within one of the discrete (cardinal) positions. In certain embodiments of the present disclosure, it is envisioned that the interconnect mechanism 400 may also provide the user with an audible indication that the support 402 and the image capture device 100 are rotationally secured as the support 402 "clicks" through the discrete cardinal positions (e.g., depending on the materials of construction utilized, the particular configuration of the biasing member 440, and the magnitude of the axial force F applied thereby, etc.).

Figure 18:
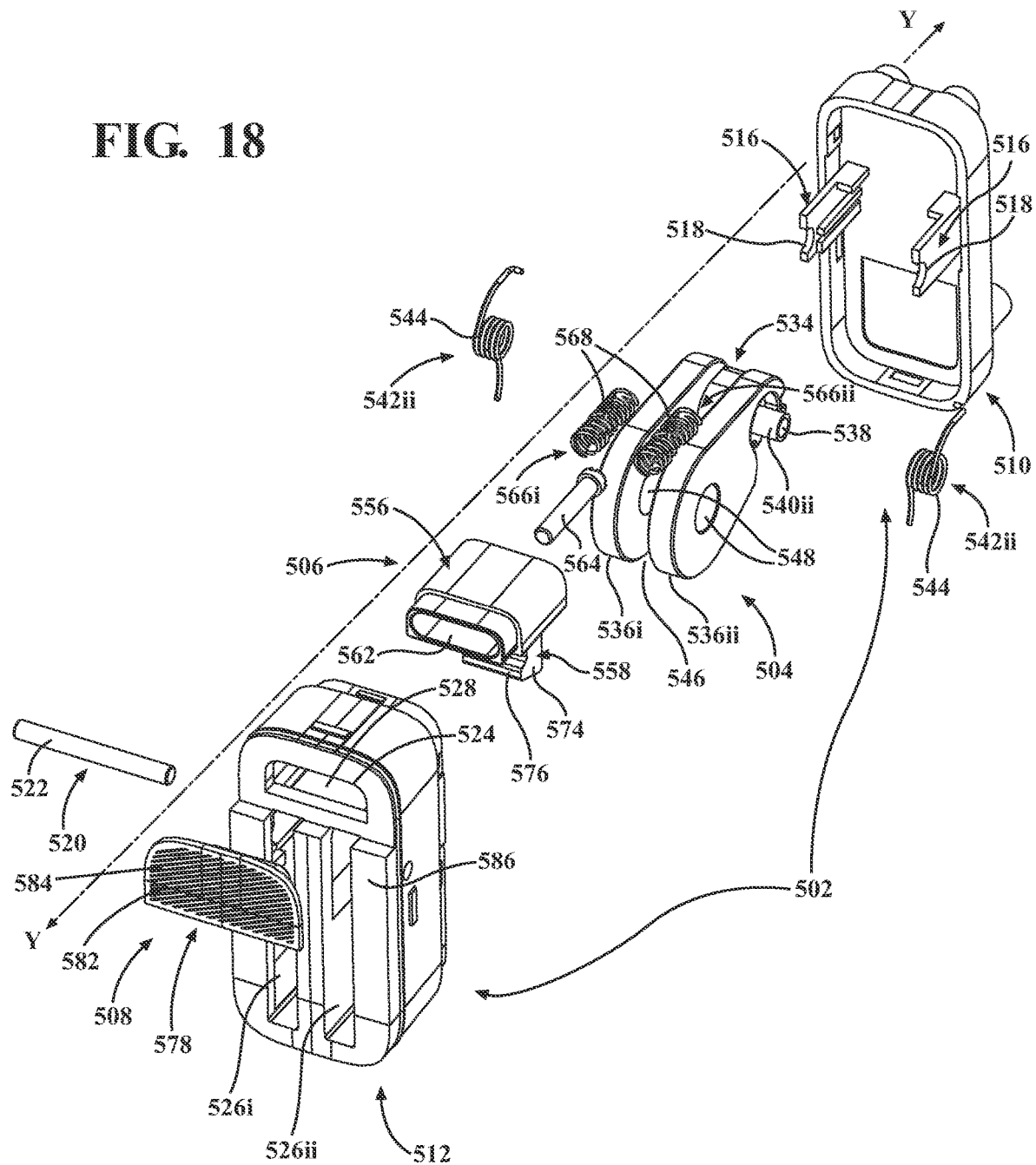
FIG. 18 is a front, perspective view of the interconnect mechanism seen in FIGS. 15 and 16 with parts separated.
Figures 19, 20:
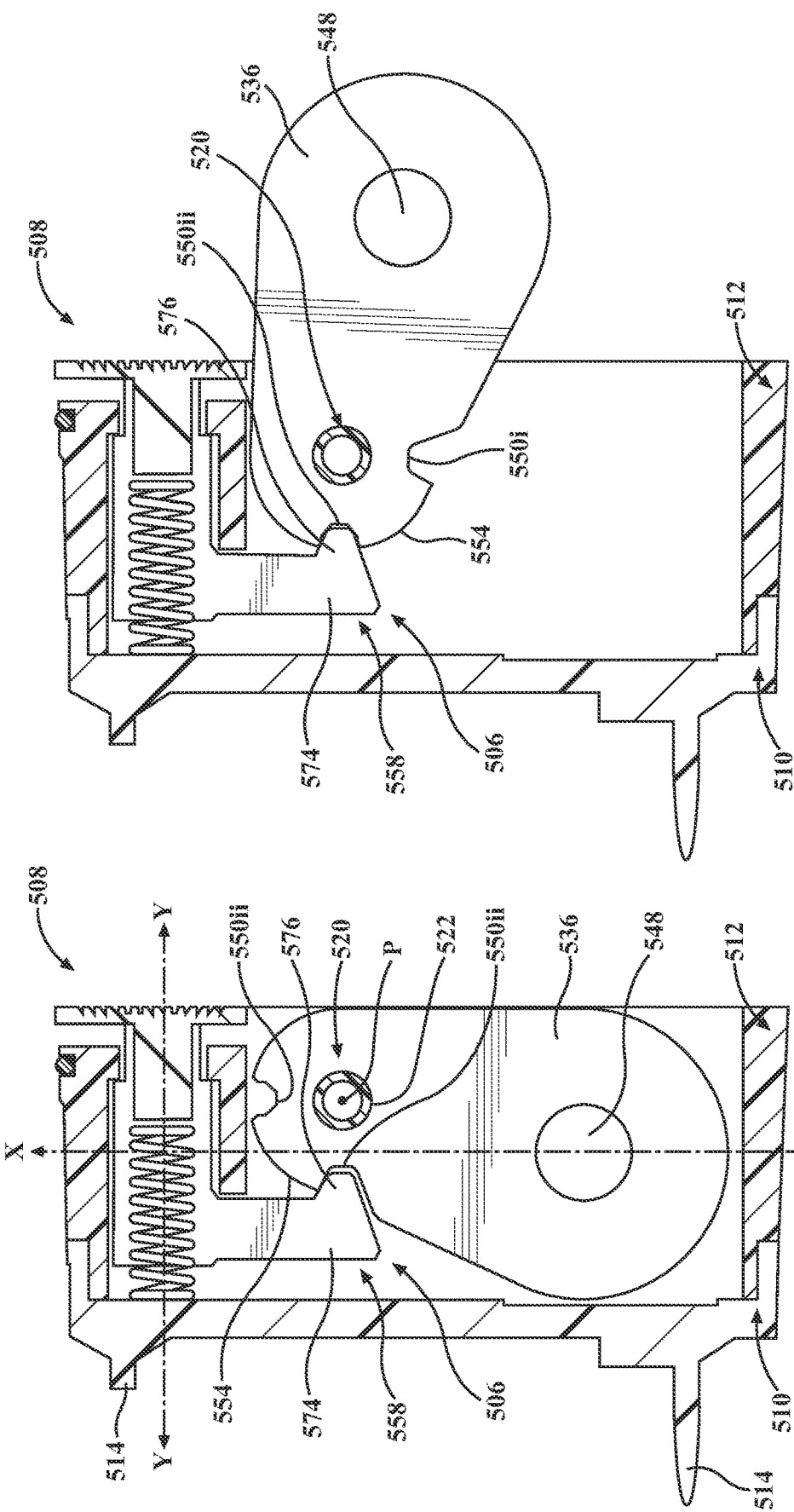
FIG. 19 is a longitudinal (vertical) cross-sectional view of the interconnect mechanism seen in FIGS. 15 and 16 shown in the stowed configuration.
FIG. 20 is a longitudinal (vertical) cross-sectional view of the interconnect mechanism seen in FIGS. 15 and 16 shown in the deployed configuration.
Figure 21:
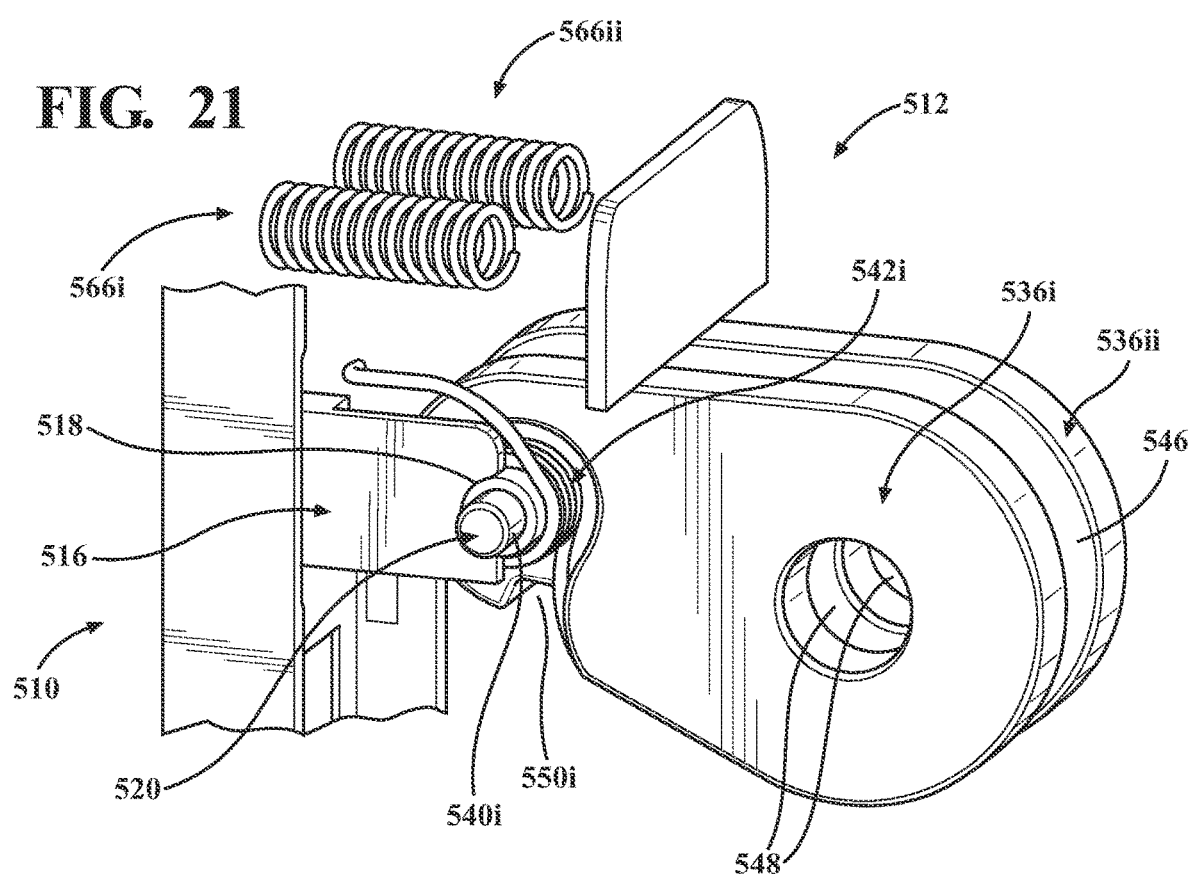
FIG. 21 is a partial, side, perspective view of the interconnect mechanism seen in FIGS. 15 and 16 shown in the deployed configuration.

With reference now to FIGS. 15-21, another embodiment of the interconnect mechanism will be discussed, which is identified by the reference character 500. More specifically, FIG. 15 provides a partial, side, perspective view of the interconnect mechanism 500 shown in the stowed (first, initial) configuration; FIG. 16 provides a partial, side, perspective view of the interconnect mechanism 500 shown in the deployed (second, subsequent) configuration; FIG. 17 provides a rear, perspective view of the interconnect mechanism 500 with parts separated; FIG. 18 provides a front, perspective view of the interconnect mechanism 500 with parts separated; FIG. 19 provides a longitudinal (vertical) cross-sectional view of the interconnect mechanism 500 shown in the stowed configuration; FIG. 20 provides a longitudinal (vertical) cross-sectional view of the interconnect mechanism 500 shown in the deployed configuration; and FIG. 21 provides a partial, side, perspective view of the interconnect mechanism 500 shown in the deployed configuration. As discussed in detail below, the interconnect mechanism 500 includes: a housing assembly 502 (FIGS. 17, 18); a (second) support 504; a locking mechanism 506; and an actuation member 508.

The housing assembly 502 defines a longitudinal axis X and includes respective first and second (e.g., rear and front) housing components 510, 512 that are configured to receive (accommodate) the remaining components of the interconnect mechanism 500 (e.g., the support 504, the locking mechanism 506, and the actuation member 508). It is envisioned that the housing components 510, 512 may be configured for connection in any suitable manner. For example, it is envisioned that the housing components 510, 512 may be fixedly connected via an adhesive, via sonic welding, etc. Alternatively, it is envisioned that the housing components 510, 512 may be releasably connected (e.g., to allow for disassembly of the housing assembly 502, maintenance and/or replacement of one or more internal components of the interconnect mechanism 500, etc.). For example, it is envisioned that the housing components 510, 512 may be releasably connected via one or more mechanical fasteners (e.g., screws, pins, etc.), via corresponding protrusions (e.g., detents) and recesses, etc.

The housing component 510 includes (a set, series, plurality of) external contact members 514 (FIGS. 17, 19, 20) (e.g., protrusions, detents, ribs, etc.) that extend rearwardly therefrom (e.g., away from the housing component 512) and a pair of braces 516 that extend forwardly therefrom (e.g., towards the housing component 512). The external contact members 514 are configured for engagement (contact) with corresponding internal contact members (e.g., recesses, openings, etc.) on the accessory A1 with which the interconnect mechanism 500 is associated, thereby facilitating connection of the interconnect mechanism 500 to the accessory A1. The braces 516 define arcuate reliefs 518 (FIG. 18) that are configured for engagement (contact) with a pivot member 520 (e.g., a pin 522 or the like) that extends through the support 504. More specifically, the pivot member 520 facilitates pivoting of the support 504 in relation to the housing assembly 502 about a pivot axis P (FIG. 19) that extends through the pivot member 520 in transverse (e.g., orthogonal (or generally orthogonal)) relation to the longitudinal axis X defined by the housing assembly 502 during reconfiguration of the interconnect mechanism 500 between the stowed configuration (FIGS. 15, 19) and the deployed configuration (FIGS. 16, 20, 21).

Engagement (contact) between the braces 516 and the pivot member 520 not only facilitates reconfiguration of the interconnect mechanism 500 between the stowed configuration and the deployed configuration, as discussed in further detail below, but stabilizes the support 504 within the housing assembly 502. More specifically, it is envisioned that the braces 516 and the pivot member 520 may be configured to inhibit (if not entirely prevent) relative lateral movement therebetween (e.g., movement along the pivot axis P).

The housing component 512 defines a window 524 (FIG. 18) that is configured to receive (accommodate) the actuation member 508 and (a set, series, plurality of) openings 526 that accommodate movement of the support 504 during reconfiguration of the interconnect mechanism 500 between the stowed and deployed configurations, as discussed in further detail below.

The window 514 communicates within an internal chamber 528 (FIG. 17) defined by the housing component 512. The internal chamber 518 is configured to receive the locking mechanism 506 such that the locking mechanism 506 is movable therein between a locked position, in which the locking mechanism 506 engages (contacts) the support 504 to maintain the configuration of the interconnect mechanism 500 (whether stowed or deployed), and an unlocked position, in which the locking mechanism 506 is disengaged (separated, spaced) from the support 504 to allow for reconfiguration of the interconnect mechanism 500 between the stowed and deployed configurations, as discussed in further detail below. More specifically, the window 514 includes a pair of rails 530 that extend towards the housing component 510 so as to define a (generally) U-shaped recess 532. The rails 520 are configured to slidably support the locking mechanism 506 during movement between the locked and unlocked positions, during which, the locking mechanism 506 moves within the U-shaped recess 522 along an axis Y (FIGS. 17-19) that extends in (generally) orthogonal relation to the pivot axis P (FIG. 19).

The support 504 is configured for engagement with (connection to) a (second) accessory A2 (FIG. 16) (e.g., a vest, a glove, a helmet, a hat, a tripod, a hand-held apparatus, a power supply, a base configured for connection to the hood of a car, a surfboard, the handlebars of a bicycle, etc.), and thereby facilitates the (indirect, operative) connection of the image capture device 100 to the accessory A2. More specifically, the support 504 is configured for connection to a mounting structure M on the accessory A2, which includes a configuration corresponding to that of the support 504 such that the interconnect mechanism 500 is connectable to the accessory A2 via connection of the support 504 and the mounting structure M, as discussed in further detail below.

The support 504 includes a spine 534 (FIGS. 17, 18) and (a second set, series, plurality of) protrusions 536 that are connected to, and which extend from, the spine 534 such that the spine 534 and the protrusions 536 move in unison during reconfiguration of the interconnect mechanism 500 between the stowed and deployed configurations. As seen in FIG. 15, in the stowed configuration, the support 504 (e.g., the protrusions 536) are concealed within the housing assembly 502. By contrast, as seen in FIG. 16, in the deployed configuration, the support 504 (e.g., the protrusions 536) are exposed and extend laterally outward from the housing assembly 502 via the openings 516 in the housing component 512 to facilitate connection to the accessory A2.

In the particular embodiment illustrated, the support 504 is integrally in construction (e.g., the spine 534 and the protrusions 536 are unitarily (monolithically) formed from a single piece of material). It is also envisioned, however, that the support 504 (e.g., the spine 534 and/or the protrusions 536) may be formed as discrete members that may be connected together in any suitable manner (e.g., via one or more mechanical fasteners, via an adhesive, via ultrasonic welding, etc.).

The spine 534 defines a channel 538 that is configured to receive the pivot member 520 and extends laterally outward from the protrusions 536 so as to define one or more sleeves 540 that are configured to support one or more biasing members 542 (e.g., torsion springs 544). The pivot member 520 extends through the spine 534 so as to facilitate engagement (contact) with the arcuate reliefs 518 defined by the braces 516 on the housing component 510, thereby rendering the support 504 captive to the interconnect mechanism 500 (e.g., such that the support 504 is a non-removable component thereof).

The biasing member(s) 542 are positioned about the sleeve(s) 540 and are configured to bias the interconnect mechanism 500 towards the deployed configuration. Although shown as being in engagement (contact) with the protrusions 536 in the particular embodiment illustrated, it is envisioned that the biasing member(s) 542 may be configured and/or positioned to act upon any suitable structure or component of the interconnect mechanism 500 (e.g., the housing component 510, the braces 516, and/or the spine 534) depending on spatial requirements, the particular materials utilized in construction of the interconnect mechanism 500, etc. While the particular specifications of the biasing member(s) 542 may be altered in various embodiments of the present disclosure, it is envisioned that the biasing force applied thereby should be of sufficient magnitude to ensure movement of the interconnect mechanism 500 into the deployed configuration in the presence of dirt, debris, etc. (e.g., within the housing assembly 502).

Although the support 504 is illustrated as including a pair of sleeves 550i, 550ii and biasing members 542i, 542ii in the particular embodiment illustrated, it should be appreciated that the particular number of sleeves 530 and biasing members 542 may be varied in alternate embodiments without departing from the scope of the present disclosure. For example, an embodiment of the interconnect mechanism 500 including a single sleeve 540 and a single biasing member 542 also envisioned herein, as are embodiments including three or more biasing members 542.

The protrusions 536 define a channel 546 therebetween and each include an opening 548 and a pair of (e.g., first and second) locking detents 550i, 550ii (FIGS. 19-21). The channel 546 and the openings 548 facilitate engagement between (connection of) the support 504 and the mounting structure M (FIG. 16) provided on the accessory A2 in a manner that is substantially similar (if not identical) to that discussed above in connection with the protrusions 432, 137 respectively included on the support 504 and the image capture device 100.

In the particular embodiment illustrated, the interconnect mechanism 500 is shown as including a pair of protrusions 536i, 536ii defining a single channel 546 therebetween, which are movable into and out of the corresponding openings 516i, 516ii (FIGS. 16, 18) in the housing component 512. It should be appreciated, however, that the particular number of protrusions 536 and openings 516 may be varied in alternate embodiments without departing from the scope of the present disclosure. For example, an embodiment of the interconnect mechanism 500 including a single protrusion 536 and a single opening 516 is also envisioned herein, as are embodiments including three or more protrusions 536 and openings 516.

To increase user comfort, it is envisioned that the protrusions 536 may include radiused (non-linear, arcuate) outer edges 552 (FIG. 17). For example, it is envisioned that the outer edges 552 may define a radius that lies substantially within the range of (approximately). 1 mm to (approximately) 0.2 mm (e.g., to balance the surface area available for contact with user feel).

The locking detents 550i, 550ii are configured for engagement (contact) with the locking mechanism 506 to maintain the interconnect mechanism 500 in the stowed and deployed configurations. More specifically, the locking detents 550i are configured for secured engagement (contact) with the locking mechanism 506 so as to maintain the interconnect mechanism 500 in the stowed configuration and inhibit (if not entirely prevent) unintended movement into the deployed configuration, as seen in FIG. 19, and the locking detents 550ii are configured for secured engagement (contact) with the locking mechanism 506 so as to maintain the interconnect mechanism 500 in the deployed configuration and inhibit (if not entirely prevent) unintended movement into the stowed configuration, as seen in FIG. 20. To facilitate such engagement (contact) between the locking detents 550i, 550ii and the locking mechanism 506, the locking detents 550i, 550ii are offset from each other by (approximately) 90 degrees along outer (peripheral) surfaces 554 (FIG. 20) of the protrusions 536. Embodiments devoid of one or more of the locking detents 550, however, would not be beyond the scope of the present disclosure. For example, in one particular embodiment, it is envisioned that the locking detents 550ii may be omitted.

The locking mechanism 506 includes a head portion 556 (FIGS. 17, 18) and a locking member 558 that extends therefrom. In the particular embodiment illustrated, the head portion 556 and the locking member 558 are illustrated as being integrally (e.g., unitarily, monolithically) formed from a single piece of material. It is also envisioned, however, that the head portion 556 and the locking member 558 may be formed as discrete members that may be connected together in any suitable manner (e.g., via one or more mechanical fasteners, via an adhesive, via ultrasonic welding, etc.).

The head portion 556 defines (a set, series, plurality of) channels 560 (FIG. 17) and a cavity 562 (FIG. 18). More specifically, the head portion 556 includes a (first) channel 560i that is configured to receive a rod 564 and a pair of (second) channels 560ii that are configured to receive corresponding biasing members 566 (e.g., compressions springs 568). Although illustrated as including a pair of channels 560i, 560ii and pair of biasing members 566i, 566ii in the particular embodiment illustrated, it should be appreciated that the particular number of channels 560 and biasing members 566 may be varied in alternate embodiments without departing from the scope of the present disclosure. For example, an embodiment of the interconnect mechanism 500 in which the head portion 556 includes a single channel 560 that is configured to receive a single biasing member 566 is also envisioned herein, as are embodiments including three or more channels 560 and biasing members 566.

The rod 564 extends through the channel 560i and is configured for engagement with (connection to) the actuation member 508 such that the actuation member 508 and locking mechanism 506 move in unison upon the (manual) application of force to the actuation member 508, as discussed in further detail below. More specifically, the rod 564 is configured for receipt within a corresponding depression 570 (FIG. 17) defined on an inner surface 582 of the actuation member 508, which facilitates proper alignment and engagement of (contact between) the locking mechanism 506 and the actuation member 508.

The biasing member(s) 566 are received within the channels 560ii such that the biasing member(s) 566 are secured between the locking mechanism 506 and the housing component 510. More specifically, the interconnect mechanism 500 is configured such that the biasing member(s) 566 are under constant compression, whereby the locking mechanism 506 is biased towards the locked position and into engagement with the support 504 (e.g., the protrusions 536).

The locking member 558 includes an arm 574 that extends axially (e.g., vertically) from the head portion 556 and a tooth 576 that extends laterally from the arm 574 (e.g., in (generally) parallel relation to the axis Y (FIG. 18) along which the locking mechanism 506 moves during repositioning between the locked and unlocked positions). The tooth 576 is configured for engagement (contact) with the locking detents 550i, 550ii defined by the protrusions 536. More specifically, when the interconnect mechanism 500 is in the stowed configuration, the tooth 576 is received by the locking detents 550i, as seen in FIG. 19, and when interconnect mechanism 500 is in the deployed configuration, the tooth 576 is received by the locking detents 550ii, as seen in FIG. 20. The tooth 576 and the locking detents 550i, 550ii include corresponding configurations and are configured to resist any (unintentional) application of external force to the support 504 (e.g., the protrusions 536) that may otherwise result in movement of the support 504, thus inhibiting (if not entirely preventing) unintended reconfiguration of the interconnect mechanism 500 from the deployed configuration to the stowed configuration.

The actuation member 508 is located vertically above the support 504 and the openings 516 in the housing component 512, and includes a tactile member 578 (FIGS. 17, 18) and a stem 580 (FIG. 17) that extends (forwardly) from the tactile member 578 (e.g., towards the housing component 512). Although shown as being integrally (e.g., unitarily, monolithically) formed in the illustrated embodiment, it is also envisioned that the tactile member 578 and the stem 580 may be formed as discrete members that may be connected together in any suitable manner (e.g., via one or more mechanical fasteners, via an adhesive, via ultrasonic welding, etc.).

The tactile member 578 includes an outer surface 582 that is configured for manual engagement by the user to facilitate movement of the locking mechanism 506 from the locked position to the unlocked position, as discussed in further detail below. To increase tactility and user feel, in certain embodiments, such as that which is illustrated, it is envisioned that the outer surface 582 may include texturing 584 (e.g., knurling or the like).

The stem 580 is configured for insertion into the cavity 562 defined by the head portion 556 of the locking mechanism 506 and extends through the window 514 in the housing component 512 such that the actuation member 508 moves (e.g., slides transversely) within the window 514 during actuation (e.g., along the axis Y (FIGS. 17, 18)). In alternate embodiments of the present disclosure, however, it is envisioned that the actuation member 508 may be instead configured for axial (e.g., vertical, longitudinal) movement, pivotable movement, rotational movement, etc.

As seen in FIG. 18, the window 514 is recessed into an outer (front) surface 586 of the housing component 512. Recessing of the window 514 not only defines a range of movement for the tactile member 578, but allows the tactile member 578 to sit (generally) flush with the outer surface 586 of the housing component 512 in the absence of any (manually) applied external force, thereby improving the overall aesthetic appearance of the interconnect mechanism 500.

The stem 580 includes the aforementioned depression 570, which is defined on the inner surface 572 thereof, so as to facilitate engagement of (contact between) the locking mechanism 506 and the actuation member 508 via the rod 564, which extends through the head portion 556. Upon the (manual) application of force to the tactile member 578, the stem 580 moves within the window 514 and into the internal chamber 518 defined by the housing component 512. Movement of the actuation member 508 results in corresponding movement of the locking mechanism 506 from the locked position to the unlocked position by virtue of the connection therebetween established by the rod 564. In certain embodiments of the present disclosure, it is envisioned that the stem 580 may be connected to the head portion 556 of the locking mechanism 506 (e.g., via one or more mechanical fasteners, via an adhesive, via ultrasonic welding, etc.) to further ensure concomitant movement of the actuation member 508 and the locking member 558.

With continued reference to FIGS. 15-21, use of the interconnect mechanism 500 will be discussed. When connection of the interconnect mechanism 500 to the accessory A2 (FIG. 16) is necessary or desired, the user (manually) depresses the actuation member 508 to actuate the support 504. Upon actuation, the stem 580 (FIG. 17) is displaced inwardly and moves within the window 514 (FIG. 18), which causes corresponding movement of the locking mechanism 506 from the locked position to the unlocked position. As the locking mechanism 506 moves from the locked position to the unlocked position, compression on the biasing member(s) 566 is increased as the tooth 576 is removed from the locking detents 550$i$ (FIG. 19) defined by the protrusions 536. Upon removal of the tooth 576 from the locking detents 550$i$, the interconnect mechanism 500 is automatically reconfigured from the stowed configuration (FIGS. 15, 19) into the deployed configuration (FIGS. 16, 19-21) by virtue of the force applied by the biasing member(s) 542 (FIGS. 17, 18). During reconfiguration of the interconnect mechanism 500, the support 504 pivots about the pivot axis P (FIG. 19) defined by the pivot member 520 extending through the spine 534, which causes movement of the protrusions 536 through the openings 516 (FIGS. 16, 18) in the housing component 512.

Following release of the actuation mechanism 496, the locking mechanism 506 is automatically returned to the locked position by virtue of the biasing force applied by (and the increased compression in) the biasing member(s) 566, which causes insertion of the tooth 576 into the locking detents 550$ii$ (FIG. 20) defined by the protrusions 536, thereby maintaining the interconnect mechanism 500 in the deployed configuration. The interconnect mechanism 500 can then be connected to the accessory A2 (FIG. 16) in the manner discussed above, which allows for either hand-held or hands-free utilization of the interconnect mechanism 500 and the image capture device 100 in a wearable use case.

Following use of the accessory A2, the support 504 can be separated therefrom and the interconnect mechanism 500 can be returned to the stowed configuration. More specifically, the user again (manually) depresses the tactile member 578, which results in movement of the locking mechanism 506 from the locked position to the unlocked position, thereby removing the tooth 576 from the locking detents 550$ii$ (FIG. 20). Upon removal of the tooth 576 from the locking detents 550$ii$, the user (manually) applies a force to the support 504 such that the support 504 pivots inwardly into the housing component 512, thereby re-inserting the protrusions 536 into the openings 516 (FIGS. 16, 18) and increasing the biasing force in the biasing member(s) 542.

The tactile member 578 can then be released, which allows the locking mechanism 506 to automatically return to the locked position under by virtue of the biasing force applied by (and the increased compression in) the biasing member(s) 566, which causes re-insertion of the tooth 576 into the locking detents 550$i$ (FIG. 19), thereby maintaining the interconnect mechanism 500 in the stowed configuration.

Figure 22:
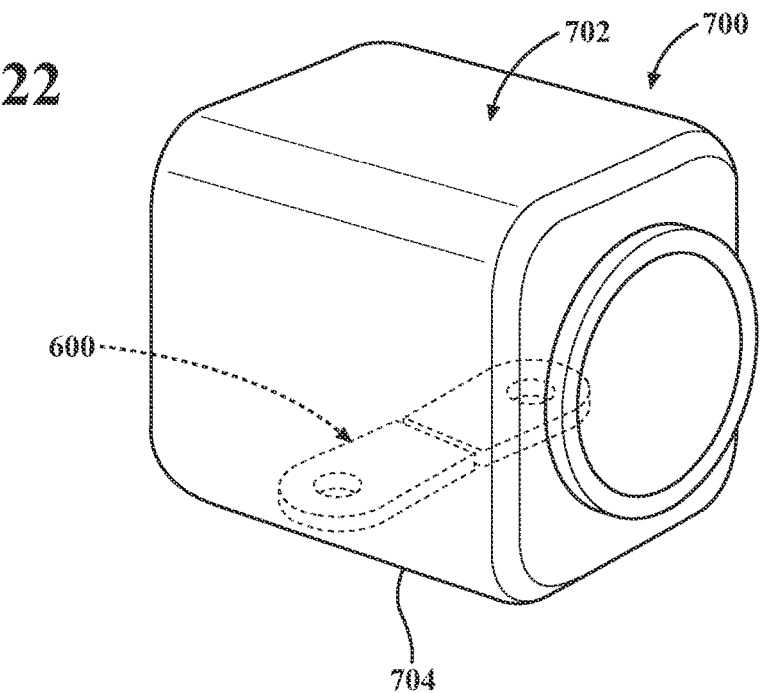
FIG. 22 is a side, perspective view illustrating alternate embodiments of the image capture device and the presently disclosed interconnect mechanism, which is shown in a stowed configuration.
Figure 23:
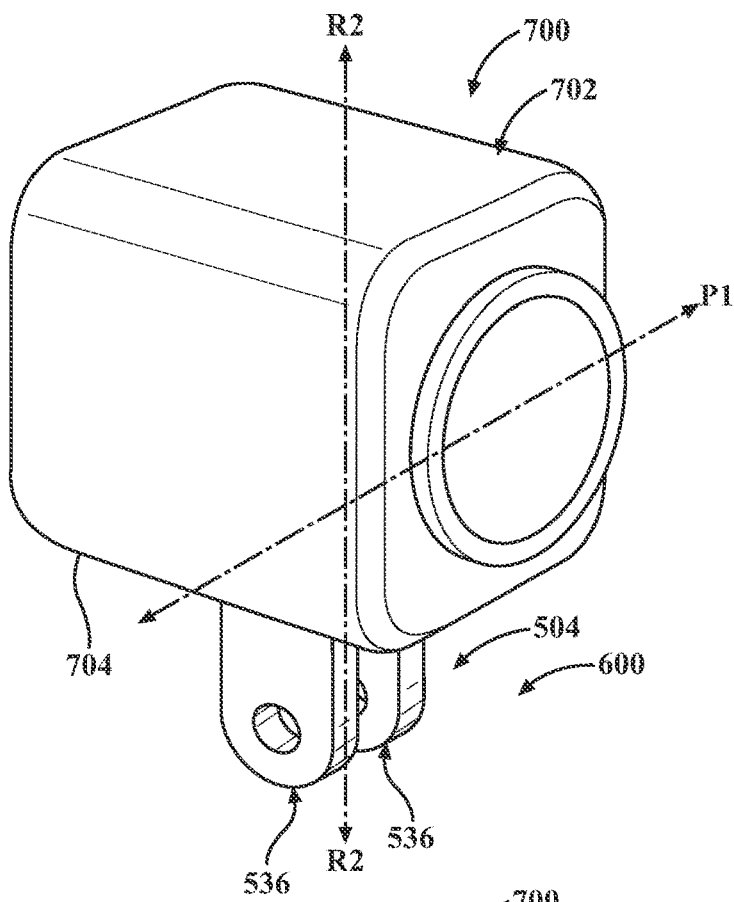
FIG. 23 is a side, perspective view of the image capture device and the interconnect mechanism seen in FIG. 22, which is shown in a deployed configuration and a first rotational position.
Figure 25:
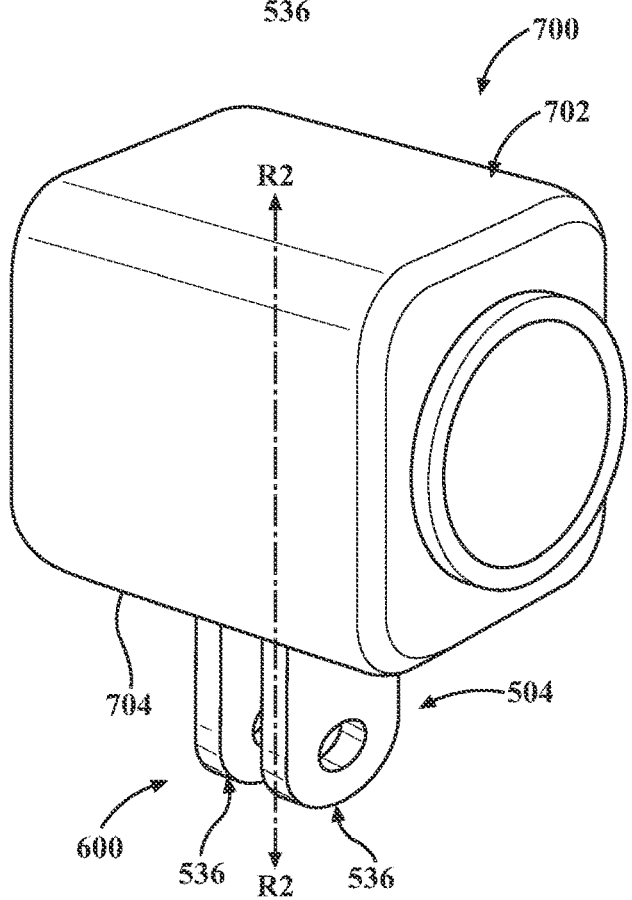
FIG. 25 is a side, perspective view of the image capture device and the interconnect mechanism seen in FIGS. 22 and 23, which is shown in the deployed configuration and a second rotational position.
Figure 24:
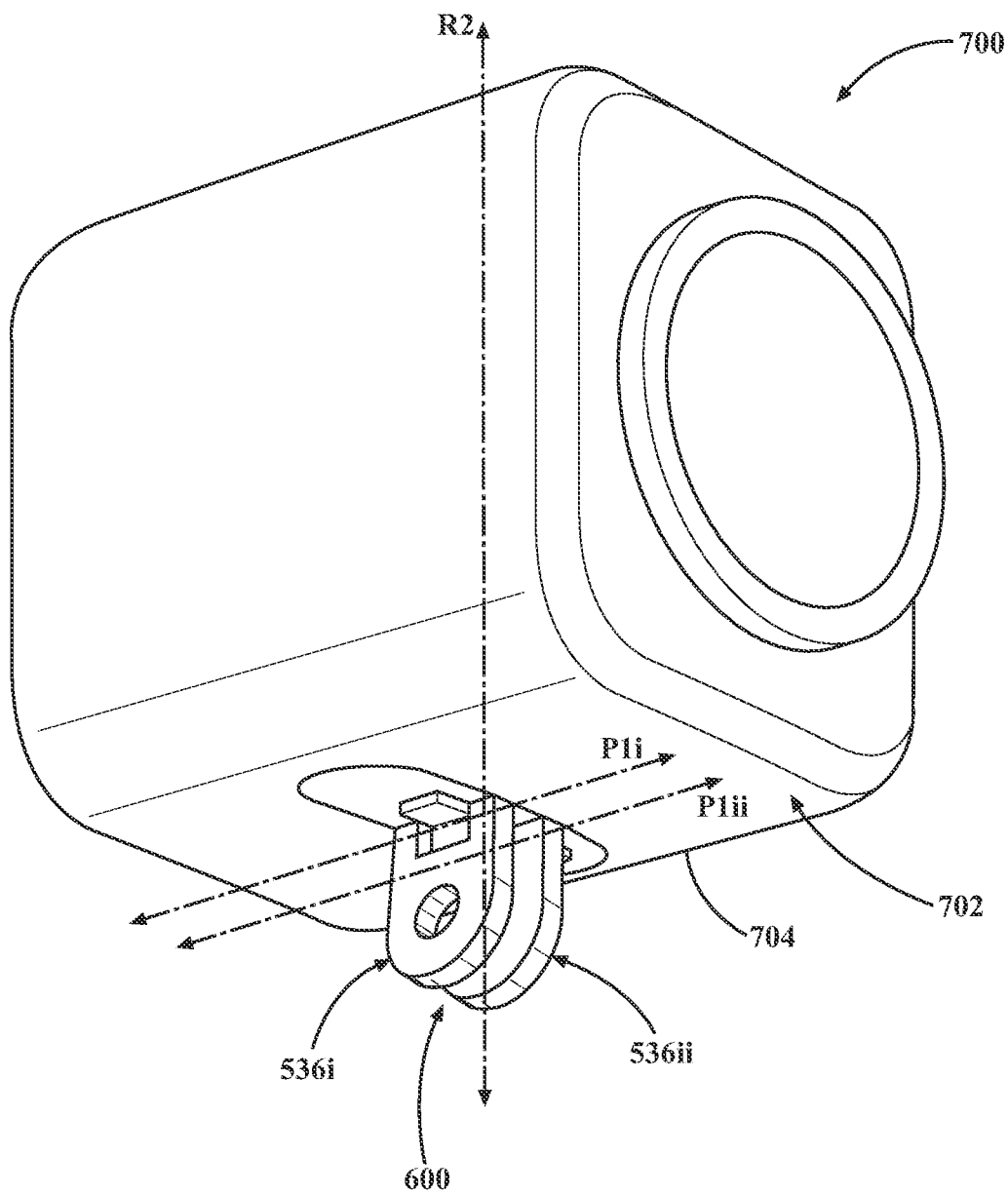
FIG. 24 is a partial, bottom, perspective view of the image capture device and an alternate embodiment of the interconnect mechanism seen in FIGS. 22 and 23, which is shown in the deployed configuration.

With reference now to FIGS. 22-25, another embodiment of the interconnect mechanism will be discussed, which is identified by the reference character 600. Throughout the following description, the interconnect mechanism 600 will be discussed in connection with an alternate embodiment of the image capture device, which is identified by the reference character 700. The image capture device 700 is substantially similar to each of the aforedescribed image capture devices in both structure and operation, but for the configuration thereof, and includes a body 702 that is generally cubic (or cuboid) in configuration. It should be appreciated, however, that the interconnect mechanism 600 may be configured for use with any image capture device, such as the various embodiments described herein above (e.g., the aforedescribed image capture devices 200, 300). More specifically, FIG. 22 provides a side, perspective view of the image capture device 700 and the interconnect mechanism 600, which is shown in a stowed (first, initial) configuration; FIG. 23 provides a side, perspective view of the image capture device 700 and the interconnect mechanism 600, which is shown in a deployed (second, subsequent) configuration and a first rotational position; FIG. 24 provides a partial, bottom, perspective view of the image capture device 700 and the interconnect mechanism 600, which is shown in the deployed configuration according to an alternate embodiment of the present disclosure; and FIG. 25 provides a side, perspective view of the image capture device 700 and the interconnect mechanism 600, which is shown in the deployed configuration and a second rotational position.

The interconnect mechanism 600 includes structures, features, and operability that is substantially similar to the aforedescribed interconnect mechanisms 400 (FIGS. 4-14), 500 (FIGS. 15-21) and, accordingly, will only be discussed with respect to any difference therefrom in the interest of brevity. As such, identical reference characters will be utilized to refer to elements, structures, features, etc., common to the interconnect mechanisms 400, 500, 600.

The interconnect mechanism 600 is pivotably reconfigurable between the stowed configuration seen in FIG. 22 and the deployed configuration seen in FIGS. 23 and 25, which facilitates the (direct) connection of the image capture device 700 and an accessory (e.g., the accessory A1 (FIG. 4) or the accessory A2 (FIG. 16)). As described in further detail below, the interconnect mechanism is also repositionable amongst a series (plurality) of rotational positions.

In one embodiment of the disclosure, it is envisioned that the interconnect mechanism 600 may include the aforementioned support 504 (FIGS. 15-21), which allows for pivotable movement of the support 504 (e.g., into and out of the body 702 of the image capture device 700) during reconfiguration of the interconnect mechanism 600 between the stowed and deployed configurations.

When the interconnect mechanism 600 is in the stowed configuration, the support 504, and, thus, the protrusions 536, are rotationally fixed in relation to the body 702 of the image capture device 700 (e.g., via engagement (contact) with the body 702). By contrast, when the interconnect mechanism 600 is in the deployed configuration, the support 504, and, thus, the protrusions 536, extend outwardly away from the body 702 of the image capture device 700, which allows for rotation of the support 504 and the protrusions 536 (in relation to the body 702) about an axis of rotation R2. For example, as discussed above in connection with the interconnect mechanism 400, in the particular embodiment illustrated, the interconnect mechanism 600 is configured for rotation between four discrete (cardinal) rotational positions (two of which are illustrated in FIGS. 23 and 25), which is facilitated via the inclusion of the aforedescribed recesses 454, 456 (FIGS. 13, 14) and indexing members 456.

Due to the integral construction of the support 504 (e.g., the unitary (monolithic) formation of the spine 534 (FIGS. 17, 18) and the protrusions 536), during reconfiguration of the interconnect mechanism 600 between the stowed configuration and the deployed configuration, the protrusions 536 move (e.g., pivot) concomitantly (e.g., in unison) about a common pivot axis P1 that extends in orthogonal (or generally orthogonal) relation to the axis of rotation R2. Embodiments of the interconnect mechanism 600 are also envisioned, however, in which the protrusions 536 may be independently movable (pivotable) about separate pivot axes. For example, in the embodiment of the interconnect mechanism 600 seen in FIG. 24, the protrusion 536*i* is pivotable (in relation to the body 702 of the image capture device 700) about a (first) pivot axis P1*i*, and the protrusion 536*ii* is pivotable about a (second) pivot axis P1*ii*, wherein each of the pivot axes P1*i*, P1*ii* extends in orthogonal (or generally orthogonal) relation to the axis of rotation R2.

In the particular embodiment illustrated, the support 504 (e.g., the protrusions 536) are configured such that the protrusions 536 do not to extend beyond an outer edge 704 (e.g., periphery, perimeter) of the body 702 of the image capture device 700 when the interconnect mechanism 600 is in either the stowed configuration or the deployed configuration, as seen in FIG. 24, for example. It should be appreciated, however, that embodiments in which the support 504 (e.g., the protrusions 536) may extend beyond the outer edge 704 of the body 702 are also envisioned herein and would not be beyond the scope of the present disclosure (e.g., depending upon the configuration of the accessory A2 (FIG. 16) intended for connection to the interconnect mechanism 600).

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally orthogonal" should be understood as referring to an arrangement in which the pertinent components (structures, elements) subtend an angle therebetween that is equal to 90° as well as an arrangement in which the pertinent components (structures, elements) subtend an angle therebetween that is greater than or less than 90° (e.g., ±25%).

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An interconnect mechanism configured to facilitate connection of an image capture device to an accessory, the interconnect mechanism comprising:
    a housing assembly defining a longitudinal axis;
    a support pivotable in relation to the housing assembly about a pivot axis extending transversely in relation to the longitudinal axis such that the interconnect mechanism is reconfigurable between a stowed configuration, in which the support is concealed within the housing assembly, and a deployed configuration, in which the support extends outwardly from the housing assembly to facilitate connection of the interconnect mechanism to the accessory; and
    a locking mechanism movable between a locked position, in which the locking mechanism engages the support to maintain the interconnect mechanism in the stowed configuration or the deployed configuration, and an unlocked position, in which the locking mechanism is disengaged from the support to allow for reconfiguration of the interconnect mechanism between the stowed configuration and the deployed configuration.

2. The interconnect mechanism of claim 1, further comprising:
    a first biasing member in engagement with the support to bias the interconnect mechanism towards the deployed configuration; and
    a second biasing member in engagement with the locking mechanism to bias the locking mechanism towards the locked position.

3. The interconnect mechanism of claim 1, wherein the support includes first protrusions defining channels therebetween configured to receive corresponding second protrusions on the image capture device.

4. The interconnect mechanism of claim 3, wherein the first protrusions and the second protrusions include reliefs configured to facilitate insertion of the second protrusions into the channels.

5. The interconnect mechanism of claim 3, wherein the first protrusions include a first locking detent configured for engagement with the locking mechanism when the interconnect mechanism is in the stowed configuration and a second locking detent configured for engagement with the locking mechanism when the interconnect mechanism is in the deployed configuration.

6. The interconnect mechanism of claim 5, wherein the first locking detent and the second locking detent are offset by approximately 90°.

7. The interconnect mechanism of claim 5, wherein the locking mechanism includes a locking member defining a tooth configured for engagement with the first locking detent and the second locking detent to thereby maintain the interconnect mechanism in the stowed configuration and the deployed configuration.

8. An interconnect mechanism configured to facilitate connection of an image capture device to an accessory, the interconnect mechanism comprising:
    first protrusions defining channels therebetween configured to receive corresponding second protrusions on the accessory, the first protrusions pivotably reconfigurable between a stowed configuration, in which the first protrusions are rotatably fixed, and a deployed configuration in which the first protrusions are rotatable about an axis of rotation, wherein the first protrusions are concomitantly reconfigurable between the stowed configuration and the deployed configuration, wherein the first protrusions are pivotable about a pivot axis extending in generally orthogonal relation to the axis of rotation.

9. The interconnect mechanism of claim 8, wherein the first protrusions are independently reconfigurable between the stowed configuration and the deployed configuration.

10. The interconnect mechanism of claim 9, wherein the first protrusions are pivotable about separate pivot axes each extending in generally orthogonal relation to the axis of rotation.

11. An interconnect mechanism configured to facilitate connection of an image capture device to an accessory, the interconnect mechanism comprising:
    a housing assembly;
    a support connected to the housing assembly such that the support is pivotable about a first axis between discrete first and second positions;
    a locking mechanism supported within the housing assembly such that the locking mechanism is repositionable along a second axis extending in generally orthogonal relation to the first axis, wherein the locking mechanism is repositionable between a locked position, in which the locking mechanism engages and fixes the support, and an unlocked position, in which the locking mechanism is disengaged from the support to allow for repositioning of the support between the discrete first and second positions; and a first biasing member configured to bias the support towards one of the first and second positions.

12. The interconnect mechanism of claim 11, wherein repositioning of the support between the discrete first and second positions exposes the support from the housing assembly and conceals the support within the housing assembly.

13. The interconnect mechanism of claim 11, wherein the first biasing member extends about the first axis.

14. The interconnect mechanism of claim 13, wherein the first biasing member is directly supported by the support.

15. The interconnect mechanism of claim 11, further comprising:
a second biasing member configured to bias the locking mechanism towards the locked position.

16. The interconnect mechanism of claim 15, wherein the second biasing member extends in generally parallel relation to the second axis.

17. The interconnect mechanism of claim 16, wherein the second biasing member extends into the locking mechanism.

18. The interconnect mechanism of claim 11, further comprising:
an actuation member received by the housing assembly such that the actuation member is movable along the second axis.

19. The interconnect mechanism of claim 18, wherein the actuation member is configured for engagement with the locking mechanism such that movement of the actuation member causes corresponding movement of the locking mechanism to facilitate repositioning of the locking mechanism between the locked position and the unlocked position.

20. The interconnect mechanism of claim 19, wherein the actuation member and the locking mechanism are movable in unison.

* * * * *